US012752309B2

(12) United States Patent
Ackerman

(10) Patent No.: US 12,752,309 B2
(45) Date of Patent: Oct. 6, 2026

(54) APPARATUS AND RELATED SYSTEMS AND METHODS FOR SELECTING TARGET PARTICLES FROM A FEEDSTREAM

(71) Applicant: Eco Metals Recovery (Holding) Limited, Saint Michael (BB)

(72) Inventor: Dean John Ackerman, Florida Park (ZA)

(73) Assignee: Eco Metals Recovery (Holding) Limited, Saint Michael (BB)

(*) Notice: Subject to any disclaimer, the term of this patent is extended or adjusted under 35 U.S.C. 154(b) by 0 days.

(21) Appl. No.: 19/116,522

(22) PCT Filed: Sep. 26, 2023

(86) PCT No.: PCT/IB2023/059547
§ 371 (c)(1),
(2) Date: Mar. 28, 2025

(87) PCT Pub. No.: WO2024/069424
PCT Pub. Date: Apr. 4, 2024

(65) Prior Publication Data

US 2026/0021511 A1 Jan. 22, 2026

Related U.S. Application Data

(60) Provisional application No. 63/377,702, filed on Sep. 29, 2022.

(51) Int. Cl.
*B07C 5/02* (2006.01)
*B07C 5/344* (2006.01)
*B07C 5/36* (2006.01)

(52) U.S. Cl.
CPC ................ *B07C 5/02* (2013.01); *B07C 5/344* (2013.01); *B07C 5/361* (2013.01)

(58) Field of Classification Search
CPC ......... B07C 5/344; B07C 5/361; B07C 5/362; B07C 2501/0036
(Continued)

(56) References Cited

U.S. PATENT DOCUMENTS 2,535,127 A 12/1950 Frei, Jr.
2,623,635 A * 12/1952 Ward ...................... B07B 13/00 361/278
(Continued)

FOREIGN PATENT DOCUMENTS

CN 101900739 A 12/2010
CN 211 587 424 9/2020
(Continued)

OTHER PUBLICATIONS

Gu; Longsheng, "High-Efficiency Nonmetal Vibration Discharging Machine" (English Translation), Sep. 29, 2020, worldwide.espacenet.com (Year: 2020).*
(Continued)

*Primary Examiner* — Molly K Devine
(74) *Attorney, Agent, or Firm* — CHRISTENSEN O'CONNOR JOHNSON KINDNESS PLLC

(57) ABSTRACT

Apparatuses for selecting and separating target particles from a feedstream are provided. The apparatus may comprise a detection mechanism, a vibration mechanism, and a body therebetween that provides vibrational homogeneity to the detection mechanism. In some embodiments, the detection mechanism comprises a plurality of detection channels, each detection channel comprising at least two individual detection zones. In some embodiments, the apparatus further comprises a flow direction mechanism including at least one actuator and at least one flow director that directs the flow of the feedstream exiting the detection mechanism. The apparatus may efficiently detect target particles while main-
(Continued)

taining a relatively small footprint. Related systems including the apparatus and related methods for making the apparatus are also provided.

17 Claims, 16 Drawing Sheets

(58) Field of Classification Search
USPC .......................................... 209/552, 556, 571
See application file for complete search history.

(56) References Cited

U.S. PATENT DOCUMENTS

| | | | |
|---|---|---|---|
| 4,022,638 | A | 5/1977 | Weet |
| 9,314,823 | B2 | 4/2016 | Bamber et al. |
| 2011/0186660 | A1 | 8/2011 | Harding et al. |
| 2013/0062443 | A1 | 3/2013 | Wang |
| 2019/0027569 | A1 | 1/2019 | Shen et al. |
| 2019/0299255 | A1 | 10/2019 | Chaganti et al. |
| 2019/0352741 | A1 | 11/2019 | Budach, Jr. et al. |

FOREIGN PATENT DOCUMENTS

| | | | |
|---|---|---|---|
| DE | 10021779 | C1 | 10/2001 |
| DE | 10118677 | A1 | 4/2003 |
| WO | WO 2022/133599 | | 6/2022 |

OTHER PUBLICATIONS

Watt et al., "On-Stream analysis of metalliferous ore slurries", International Journal of Applied Radiation and Isotops, Pergamon Press, New York, NY, US, vol. 24, No. 1, Jan. 1, 1983, pp. 309-331.

Barette, L. and S. Turmel, "On-line irone-ore slurry monitoring for real-time process control of pellet making processes using laser-induced breakdown spectroscopy: graphitic vs. total carbon detection", Spectrochimica Acta Part B, vol. 56B, 2001, pp. 715-723.

Holynska, B. et al., "Benefits of automatic multielemental analysis of zinc-lead ore slurries by radioisotope x-ray flourescence" In: "Technical and Economic Benefits of Nuclear Techniques in Ore Processing", Aug. 1989, International Atomic Energy Agency, Vienna, pp. 43-49.

International Search Report and Written Opinion for PCT/IB2023/059547, mailed Apr. 4, 2024.

* cited by examiner

APPARATUS AND RELATED SYSTEMS AND METHODS FOR SELECTING TARGET PARTICLES FROM A FEEDSTREAM

CROSS-REFERENCE TO RELATED APPLICATIONS

This application is a U.S. National Stage Application of PCT/IB2023/059547, filed Sep. 26, 2023, which claims priority to U.S. Provisional Application No. 63/377,702, filed Sep. 29, 2022, the disclosures of which are incorporated herein in their entirety.

TECHNICAL FIELD

The present disclosure relates to separation of particles from an aggregate feedstream. More particularly, the present disclosure relates to apparatuses and related systems and methods for selecting and separating metal particles from aggregate ore.

BACKGROUND

Bulk ores are mined to obtain high-value minerals, including precious metals such as gold, platinum, and silver. The ore may have its origin in rock deposits within the earth surface or above ground such as in alluvial deposits. Often, bulk ore obtained from refractory hard rock deposits is physically processed to liberate the precious metals, such as by crushing or comminution. Precious metals in alluvial deposits are generally present in the bulk ore as fully liberated particles; however, such particles are greatly dispersed within the ore. Thus, the metal particles typically require detection and separation from the rest of the ore. The bulk flow may thereby be separated into a concentrated stream of the desired particles (the "product stream") and a waste stream of the remaining ore material (the "tailings").

A variety of processes have been developed for the recovery of minerals and metals from ore. One example of such a process is outlined in U.S. Patent Publication No. 20190352741A1 to Budach, published Nov. 21, 2019. This reference discloses a process by which an ore-bearing slurry feedstream is flowed across a series of rollers arranged transversely with respect to the feedstream flow path. Each roller includes a respective electrical detector that detects the presence of metallic particles. If metallic particles are detected at a given roller, that roller rotates to eject the slurry therein into a separate collection stream. However, the arrangement of the rollers and detectors in the Budach system may result in target particles bypassing the detector, for example, by flowing over the roller or lying on top of the slurry feedstream. Moreover, increasing the capacity of the system requires adding additional rollers either in series or in parallel, which in turn increases the length or width of the system, resulting in a large physical footprint and high capital costs.

An improved detection and recovery system is described in International Publication No. WO 2022/133599 to Goodwin et al., published Jun. 30, 2022. The Goodwin et al. system uses detector/ejectors that are in-line with the flow path of the slurry feedstream instead of transverse thereto. A more compact footprint is achieved with actuate paths and multi-level conveyance. However, the system is still relatively capital-intensive and may still result in target particles bypassing the detectors.

SUMMARY

In one aspect, there is provided an apparatus for selecting target particles from a feedstream, comprising: at least one detection channel, each detection channel defining a respective flow path for a portion of the feedstream and comprising at least one sensor capable of detecting the target particles; a vibration mechanism that vibrates the at least one detection channel; a body interconnecting the at least one detection channel and the vibration mechanism, the body providing vibrational homogeneity across the at least one detection channel; and a flow direction mechanism that directs the flow of the portion of the feedstream as it exits the at least one detection channel.

In some embodiments, the body is a unitary structure with homogenous surfaces.

In some embodiments, a middle portion of the body has an approximately frusto-conical profile.

In some embodiments, the body is formed by three-dimensional printing.

In some embodiments, at least a portion of the body has an internal honeycomb structure.

In some embodiments, the at least one sensor comprises a first electrode and a second electrode spaced by a gap therebetween, wherein the presence of the target particles is detected when one or more of the target particles straddles the gap.

In some embodiments, the at least one sensor further comprises an insulating spacer disposed in the gap between the first electrode and the second electrode.

In some embodiments, the at least one detection channel is a V-shaped trough, and wherein the gap between the first electrode and the second electrode is positioned at an apex of the V-shaped trough.

In some embodiments, the at least one detection channel comprises a first detection zone in-line with a second detection zone, each of the first and second detection zones comprising a respective sensor of the at least one sensor.

In some embodiments, the at least one detection channel comprises two or more adjacent detection channels parallel to one another, wherein each of the two or more adjacent detection channels comprises a respective first detection zone and second detection zone.

In some embodiments, the flow direction mechanism comprises at least one actuator and at least one flow director, wherein each actuator actuates a respective flow director between a first position and a second position to direct the flow of the portion of the feedstream.

In some embodiments, the respective flow director is U-shaped with a bottom wall and opposed side walls, and wherein the bottom wall is approximately vertical when the respective flow director is in the first position and angled when the respective flow director is in the second position.

In some embodiments, the at least one actuator comprises a first actuator and a second actuator and the at least one flow director comprises a first flow director and a second flow director, and wherein the first flow director is positioned adjacent to a first detection channel of the at least one detection channel and the second flow director is positioned adjacent to a second detection channel of the at least one detection channel.

In some embodiments, the first and second actuators independently actuate the first and second flow directors, respectively.

In another aspect, there is provided a system comprising: at least one apparatus according to any embodiment of the apparatuses disclosed herein; and a controller operatively connected to the at least one apparatus, the controller actuating the flow direction mechanism responsive to output from the at least one sensor.

In some embodiments, the at least one apparatus comprises a first apparatus and a second apparatus, and wherein the second apparatus is positioned below the first apparatus such that the second apparatus receives a residual stream of the portion of the feedstream from the first apparatus.

In some embodiments, the first apparatus and the second apparatus are each mounted to a respective mounting plate via at least one respective vibration dampening coupler.

In another aspect, there is provided a method for making an apparatus, comprising: providing a detection mechanism; providing a vibration mechanism for transport of a flowable material through the detection mechanism; and connecting the detection mechanism and the vibration mechanism such that vibrations are homogenously transferred from the vibration mechanism to the detection mechanism.

In some embodiments, the method further comprises providing a unitary body having homogenous surfaces, and wherein the detection mechanism and the vibration mechanism are connected via the unitary body.

In some embodiments, providing the unitary body comprises forming the unitary body by 3D-printing.

In some embodiments, the method further comprises: providing a flow direction mechanism for directing the flow of the flowable material as the flowable material exits the detection mechanism; and connecting the flow direction mechanism to the unitary body.

In another aspect, there is provided a method for selecting target particles from a feedstream, comprising: flowing a portion of the feedstream through at least one detection channel, the at least one detection channel comprising at least one sensor capable of detecting the target particles; vibrating, via a vibration mechanism, the at least one detection channel as the portion of the feedstream flows therethrough, wherein vibrations are homogenously transferred from the vibration mechanism to the at least one detection channel; detecting, via the at least one sensor, the presence of at least one target particle in the portion of the feedstream; and directing the flow of the portion of the feedstream responsive to output of the at least one sensor.

In some embodiments, the vibrations are homogenously transferred from the vibration mechanism to the at least one detection channel via a unitary body with homogenous surfaces, the unitary body interconnecting the vibration mechanism and the detection channel.

Other aspects and features of the present disclosure will become apparent, to those ordinarily skilled in the art, upon review of the following description of specific embodiments of the disclosure.

BRIEF DESCRIPTION OF THE DRAWINGS

Some aspects of the disclosure will now be described in greater detail with reference to the accompanying drawings. In the drawings.

DETAILED DESCRIPTION

Figure 1A:
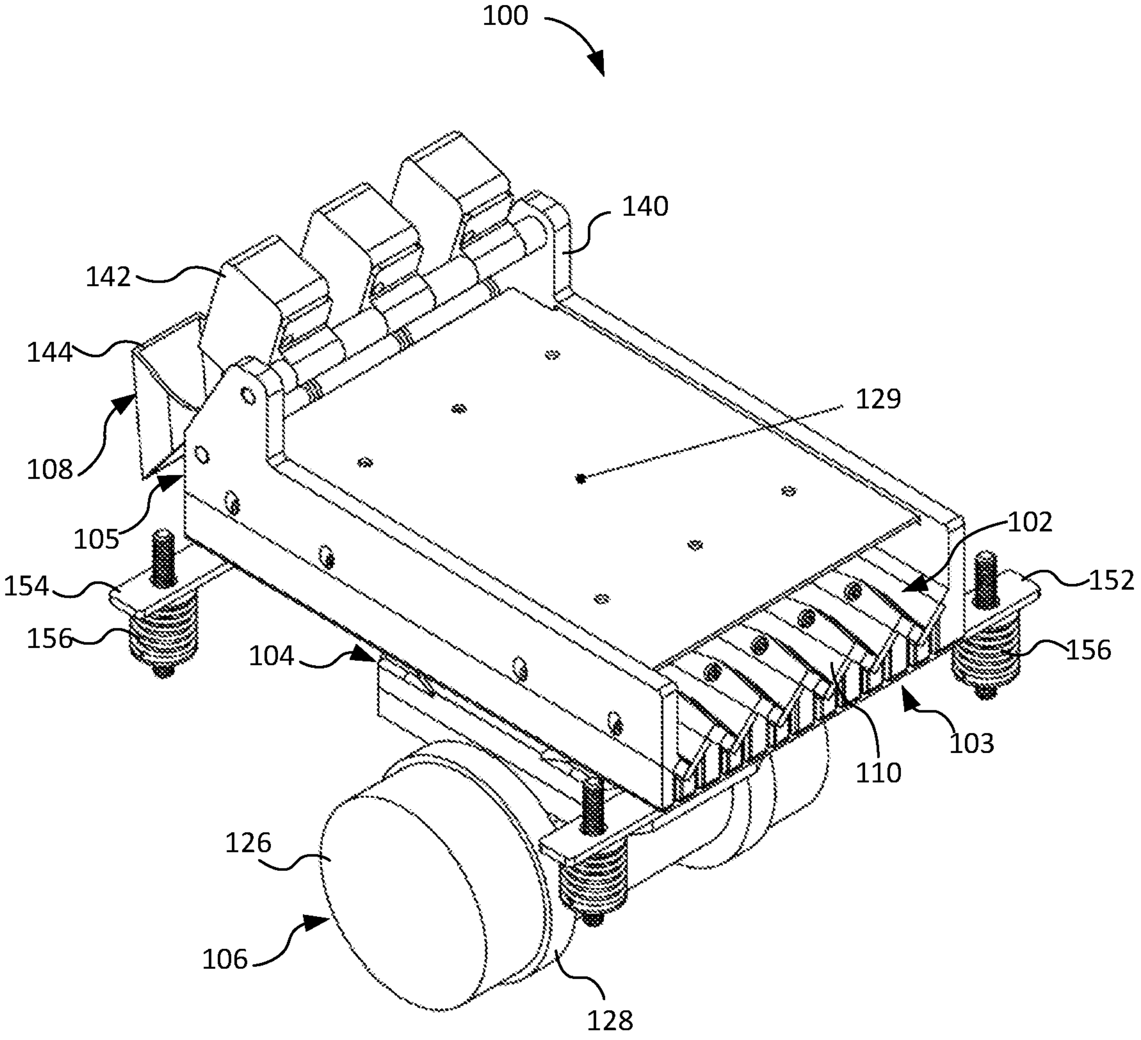
FIG. 1A is a perspective view of an example apparatus for selecting target particles from a feedstream, according to some embodiments.

Generally, the present disclosure provides an apparatus for selecting and separating target particles from a feedstream. The apparatus may comprise a detection mechanism, a vibration mechanism, and a body therebetween that provides vibrational homogeneity to the detection mechanism. In some embodiments, the detection mechanism comprises a plurality of detection channels, each detection channel comprising at least two individual detection zones. In some embodiments, the apparatus further comprises a flow direction mechanism including at least one actuator and at least one flow director that directs the flow of the feedstream exiting the detection mechanism. Related systems including the apparatus and related methods for making the apparatus are also provided.

As used herein the terms “a”, “an”, and “the” may include plural referents unless the context clearly dictates otherwise.

As used herein, the terms “top” and “bottom”, “upper” and “lower”, “upward” and “downward”, “horizontal” and “vertical” and the like refer to the typical orientation of the apparatuses and systems disclosed herein; however, a person skilled in the art will recognize that these are relative terms that are used for ease of description only and do not limit the orientation of the apparatuses or systems.

As used herein, “feedstream” refers to a material containing targeted particles to be selected and separated therefrom in the apparatuses, systems, and methods disclosed herein. The feedstream may comprise aggregate ore and the targeted particles may comprise metallic particles. Non-limiting examples of metallic particles include gold, platinum, silver, and steel. In other embodiments, the targeted particles may comprise any other commercially valuable metal or mineral and embodiments are not limited to the specific particles disclosed herein. The feedstream may be a flowable material capable of flowing through the apparatuses disclosed herein.

The aggregate ore may be obtained from bulk ore mined from a deposit. The bulk ore may be mined from a rock deposit, alluvial deposit, or any other suitable deposit. The bulk ore may undergo one or more processing steps to produce the aggregate ore feedstream. In some embodiments, the bulk ore is subjected to comminution to reduce the average particle size of the aggregate. Alternatively, or additionally, the bulk ore may be subjected to beneficiation to reduce the unwanted material ("gangue") to improve detection of the targeted particles in the feedstream.

The feedstream may comprise a dry stream or a wet stream of the aggregate ore. The wet stream may be a slurry of ore and water. Wet streams are typically used for larger particle sizes (e.g., particles greater than about 1 mm in diameter), while dry streams are suitable for most particle sizes and are particularly suited for smaller particle sizes (e.g., particles less than about 1 mm in diameter).

An example apparatus 100 for selecting targeted particles from a feedstream will be discussed with reference to FIGS. 1A to 7. The apparatus 100 will be discussed with reference to an aggregate ore feedstream containing metallic particles; however, it will be understood that the apparatus 100 can be adapted for use with other feedstreams and other target particles.

Figure 1B:
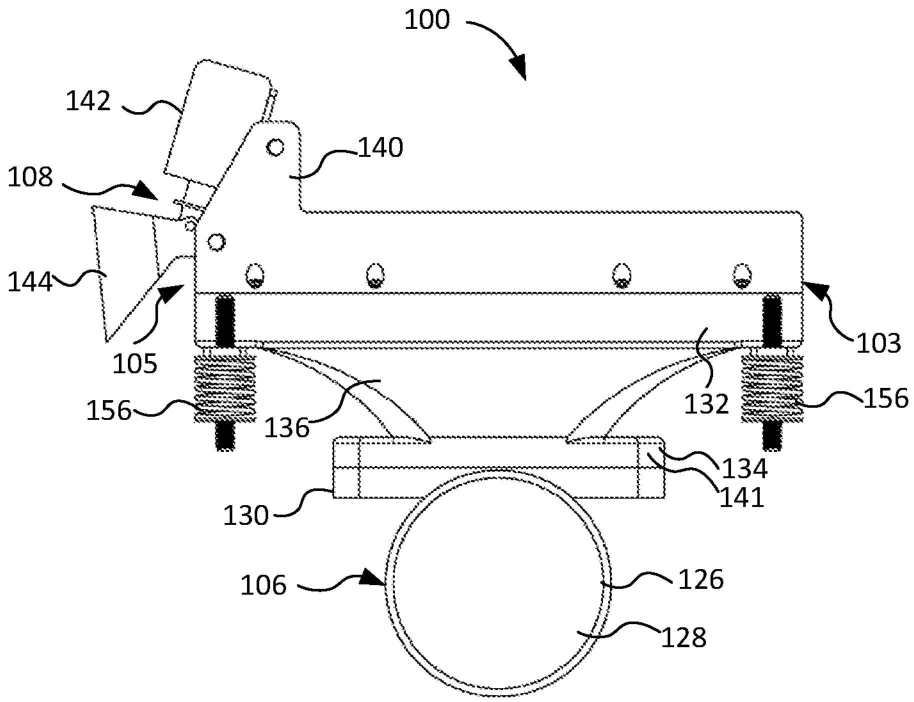
FIG. 1B is a side view of the apparatus of FIG. 1A.
Figure 1C:
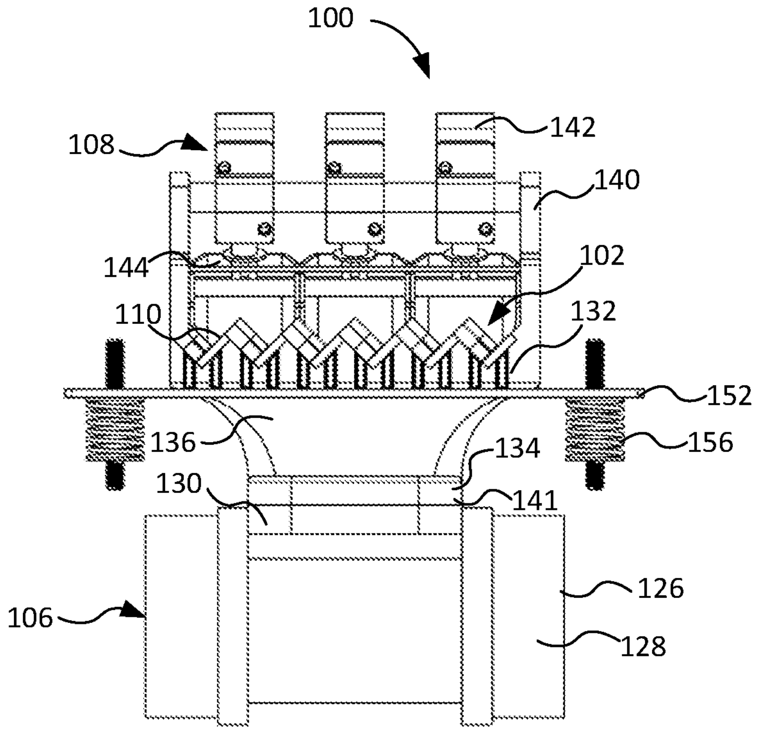
FIG. 1C is an end view of the apparatus of FIG. 1A.

Referring to FIGS. 1A-1C, the apparatus 100 in this embodiment comprises a detection mechanism 102, a main body 104, a vibration mechanism 106, and a flow direction mechanism 108.

The detection mechanism 102 comprises at least one detection channel 110 and may comprise a plurality of detection channels 110 in some embodiments. In this embodiment, the detection mechanism 102 comprises six detection channels 110 (visible in FIGS. 1A and 1C); however, it will be understood that embodiments are not limited to only six channels 110 and the detection mechanism 102 may comprise any other suitable number and configurations of channels 110.

The detection mechanism 102 will be discussed in more detail with reference to FIGS. 2A and 2B. The detection mechanism 102 has an inlet end 103 and an outlet end 105. Each detection channel 110 extends from the inlet end 103 to the outlet end 105 and defines a respective flow path (indicated by arrows "F" in FIG. 2B) for a portion of the feedstream.

Each detection channel 110 comprises at least one detection zone. In this embodiment, each channel 110 comprises a first detection zone 111 and a second detection zone 113 (only one pair of first and second detection zones 111 and 113 are labeled in FIGS. 2A and 2B for simplicity). The first and second detection zones 111 and 113 are in-line (i.e., tandem) with one another. As used herein, "in-line" refers to being within the same discrete flow path. In some embodiments, the first and second detection zones 111 and 113 are substantially collinear with one another; however, embodiments are not limited to only collinear arrangements. The first detection zone 111 is proximate the inlet end 103 and the second detection zone 113 is proximate the outlet end 105. Each detection zone comprises at least one sensor capable of detecting the presence of the target particles. In this embodiment, the first detection zone 111 comprises a first sensor 112 and the second detection zone 113 comprising a second sensor 114.

The first and second sensors 112 and 114 in this embodiment are electrical conductivity sensors. In other embodiments, the first and second sensors 112 and 114 may comprise any other suitable type of sensor.

The first sensor 112 will be discussed in more detail with reference to FIGS. 3A to 3E. The first sensor 112 comprises a first electrode 116 and a second electrode 118. The first and second electrodes 116 and 118 are generally elongate in shape. The first electrode 116 in this embodiment is approximately rectangular in shape and has a first side face 115A (visible in FIG. 3D), a second side face 115B, and a top face 117. The first side face 115A, second side face 115B, and top face 117 are all flat (linear) surfaces. The second electrode 118 has a first side face 119A (visible in FIG. 3D), a second side face 119B and a top face 121. The first side face 119A and the second side face 119B are flat (linear), while the top face 121 is undulating with alternating ascending and descending ramps. The second side face 115B of the first electrode 116 and the first side face 119A of the second electrode 118 face towards one another. Optionally, the first and second electrodes 116 and 118 define a series of openings 123 therethrough with a bushing 125 positioned in each opening 123.

Figure 3A:
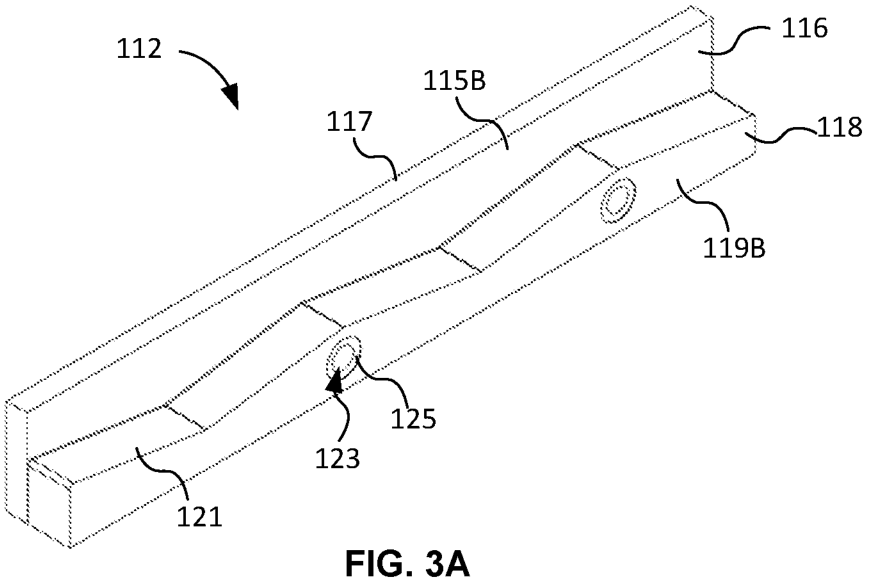
FIG. 3A is a perspective view of a sensor of the apparatus of FIGS. 1A-1C.
Figure 3B:
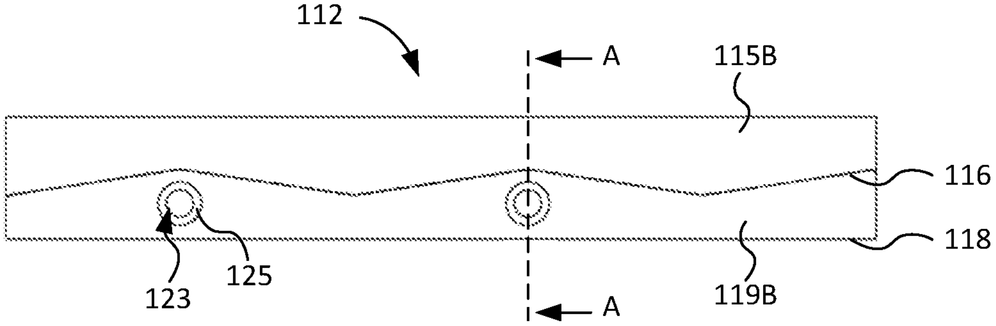
FIG. 3B is a side view of the sensor of FIG. 3A.
Figure 3C:
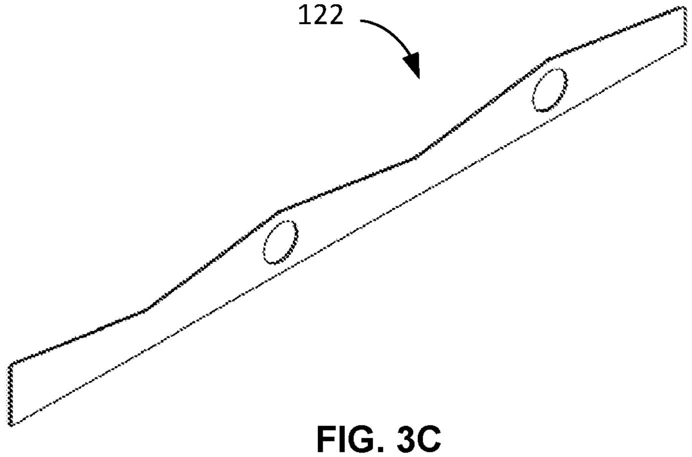
FIG. 3C is a perspective view of a spacer of the sensor of FIG. 3A.
Figure 3E:
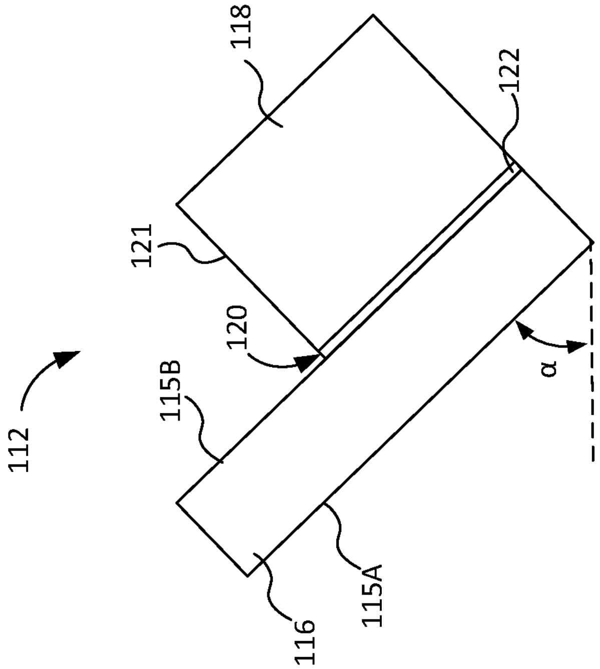
FIG. 3E is an end view of the sensor of FIG. 3A, shown at an angle at which the sensor is installed in the apparatus of FIGS. 1A-1C.
Figure 3D:
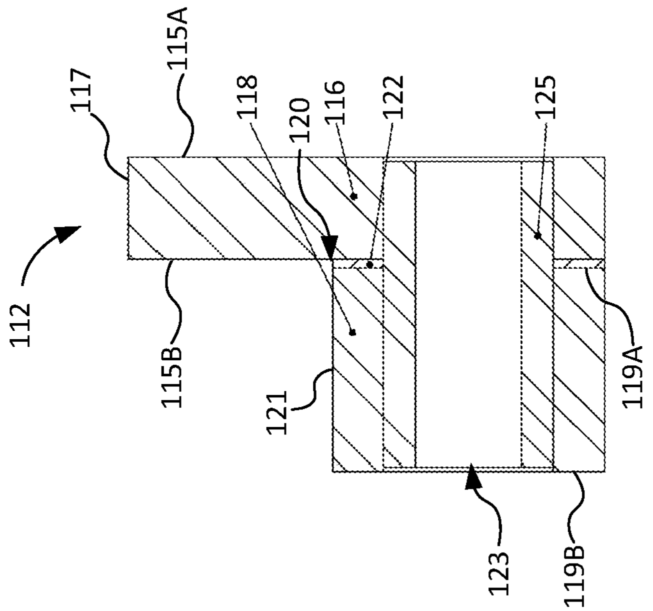
FIG. 3D is a cross-sectional view taken along line A-A in FIG. 3B.

Referring to FIGS. 3D and 3E, the first electrode 116 is positioned approximately parallel to the second electrode 118 and the first and second electrodes 116 and 118 are spaced such that a gap 120 is formed between the second side face 115B of the first electrode 116 and the first side face 119A of the second electrode 118. The spacing between the first and second electrodes 116 and 118 may be selected such that the gap 120 is equal to or smaller than the average diameter of the targeted metal particles. Detection of metallic particles thereby occurs when particles straddle the gap 120 at the surface interface between the first and second electrodes 116 and 118. As metallic particles are electrically conductive, straddling the gap 120 at the surface interface completes a circuit between the first and second electrode 116 and 118, thereby generating a signal that can be detected by a controller (discussed in more detail below).

In this embodiment, an insulating spacer 122 (visible in FIGS. 3C-3E). is positioned in the gap 120 between the first electrode 116 and the second electrode 118. The spacer 122 has the same width as the gap 120 such that the gap 120 is substantially filled. The spacer 122 may be approximately flush with the second electrode 118. In this embodiment, the spacer 122 has approximately the same undulating profile as the second electrode 118 and is therefore approximately flush with the top face 121 of the second electrode 118. The spacer 122 may be made of an electrically insulating material. In some embodiments, the electrically insulating material is plastic including, but not limited to, polylactic acid (PLA). In other embodiments, the electrically insulating material is any other suitable material.

The spacer 122 may maintain the spacing between the first electrode 116 and the second electrode 118 such that the gap 120 has approximately the same width along the entire length of the sensor 112. The spacer 122 may also prevent fine particles in the feedstream from clogging the gap 120, which may occur in embodiments in which the gap 120 is only filled with air. If the particles clogging the gap 120 are conductive, then false positive readings may result. The inclusion of the spacer 122 may thereby prevent such false positives. In addition, the width (i.e., thickness) of the spacer 122 can be adjusted to adjust the width of the gap 120, and thereby vary the selectively and sensitivity of the sensor 112 to detect different particle sizes.

Figure 2A:
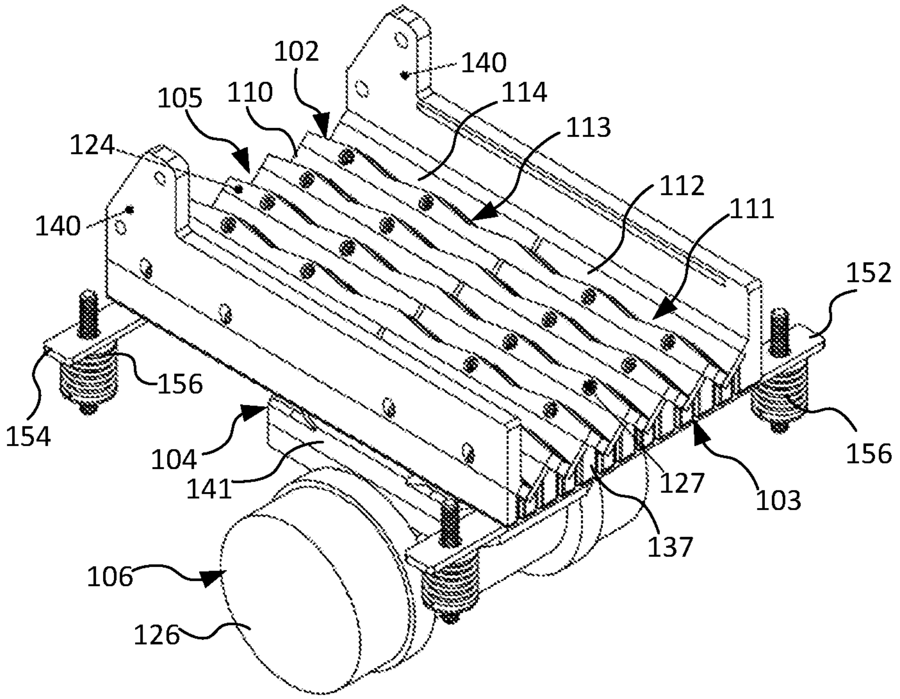
FIGS. 2A and 2B are perspective and top views, respectively, of the apparatus of FIGS. 1A-1C, shown without a flow direction mechanism.
Figure 2B:
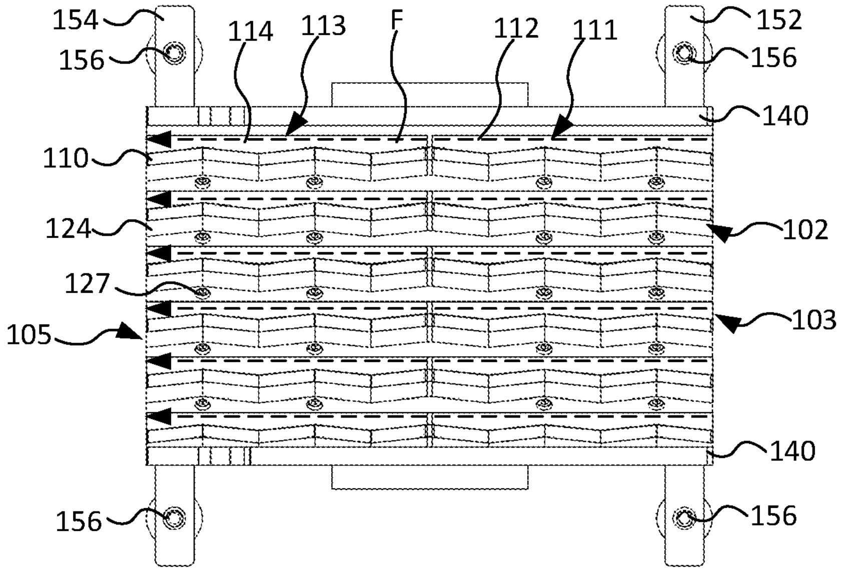

As shown in FIG. 2A, each detection channel 110 may be an approximately V-shaped trough and the first sensor 112 is mounted to the body 104 at an angle such that the combination of the first electrode 116 and the second electrode 118 also form an approximate "V" shape. As shown in FIG. 3B, to form the "V" shape, the first sensor 112 is tilted such that the first side face 115A of the first electrode 116 is at an angle α from the horizontal plane. The angle α is greater than 0 and less than about 90°. More particularly, the angle α maybe between about 10° and about 80° or between about 30° and about 60°. In the embodiment shown in FIG. 3D, the angle α is approximately 45°. In other embodiments, the angle α is any other suitable angle.

Thus, in this embodiment, the second side face 115B of the first electrode 116 and the undulating top face 121 of the second electrode 118 define the flow path of the detection channel 110 and the gap 120 is at the approximate bottom apex of the "V"-shaped flow path. As metallic particles tend to have a higher density than the rest of the aggregate ore, gravity will tend to cause the metallic particles to settle and concentrate along the bottom of the feedstream, thus increasing the opportunity for one or more particles to contact the gap 120 and complete the circuit. Moreover, as the feedstream passes over the undulating top face 121 of the second electrode 118, the particles will repeatedly move gradually upward, then fall abruptly downward, thereby facilitating the density-based settling of the metallic particles. Although one particular undulating profile is depicted in FIGS. 3A and 3B, other profiles are also possible including those disclosed in International Publication No. WO 2022/133599, incorporated herein by reference.

This gravity segregation of metallic particles in the feedstream is also enhanced by the vibratory action of the vibration mechanism 106, as described in more detail below. Depending on the nature of the feedstream, and the effects of the vibratory action of the vibration mechanism 106, the undulating profile of the second electrode 118 may be omitted and the top face 121 may instead be a linear (flat) face.

In this embodiment, the second sensor 114 has the same structure as the first sensor 112, as described above. Embodiments are also contemplated in which the first and second sensors 112 and 114 have different structures or are different types of sensors. In embodiments in which other types of sensors are used, the detection channel 110 may not be V-shaped and may instead have any other suitable shape.

Referring again to FIGS. 2A and 2B, the second sensor 114 is positioned adjacent to and in-line with the first sensor 112 such that the detection channel 110 is substantially continuous but includes two discrete detection zones 111 and 113. The first detection zone 111 allows metallic particles to be detected as the feedstream enters the detection channel 110 at the inlet end 103 and the second detection zone 113 allows particles to be detected shortly before the feedstream exits the detection channel 110 at the outlet end 105. When the feedstream initially enters the detection channel 110, material flow characteristics may temporarily obscure or blind detection of the target particle. For example, the denser metallic particles may be dispersed within the aggregate ore and few particles may be proximate the bottom of the feedstream to contact the gap 120 of the first sensor 112. Thus, the feedstream may pass through the first detection zone 111 without triggering an electrical signal via the first sensor 112. However, as the feedstream moves through the channel 110 along the flow path F, the combination of the V-shaped channel 110 and the vibration of the vibration mechanism 106 (and optionally the undulating profile of the second electrode 118) may facilitate settling of the metallic particles towards the bottom of the feedstream via gravity segregation. Therefore, there is an increased likelihood of particles contacting the gap 120 of the second sensor 114 and generating a signal therefrom before the feedstream exits the detection channel 110. Whether a newly settled particle is detected in the first detection zone 111 or the second detection zone 113, that portion of the feedstream is identified as containing metallic particles and, thus, harvestable. The second detection zone 113 may therefore act as a "backup" detection zone. Alternatively (or additionally), the second detection zone 113 may act as a confirmation detection zone to confirm that a detection signal generated from the first detection zone 111 is due to the presence of target particles and not a false positive due to background noise.

The six detection channels 110 are parallel to one another and each detection channel 110 is connected to an adjacent detection channel 110 via a respective mounting bracket 124. In this embodiment, each mounting bracket 124 is coupled to the side of the second electrodes 118 of a given detection channel 110 via bolts 127 extending into the openings 123 with bushings 125 therein. Each mounting bracket 124 has an undulating profile that matches the undulating profile of the second electrodes 118. The bottom of the mounting bracket 124 engages the linear top face 117 of the first electrodes 116 of the adjacent detection channel 110. In other embodiments, the mounting brackets 124 may interconnect adjacent detection channels 110 by any other suitable means.

Optionally, the detection channels 110 can be at least partially enclosed by a cover 129 (visible in FIG. 1A) that attaches to the body 104. The cover 129 may help to direct the flow of the feedstream through the detection channels 110.

By providing six detection channels 110, each with two detection zones 111, 113, the apparatus 100 therefore provides a total of twelve individual detection zones. This plurality of detection zones may increase the likelihood of detecting the targeted particles within the feedstream and improve recovery efficiency and/or help to maintain a relatively small physical footprint for a given acceptable recovery. Other variations are also possible and the apparatus can be adapted to include additional detection channels (and additional detection zones per channel) as appropriate. Alternatively, the apparatus 100 may be made more compact by reducing the number of detection channels.

Referring again to FIGS. 1A-1C, the vibration mechanism 106 is configured to vibrate the plurality of detection channels 110 of the detection mechanism 102. For dry feedstreams, vibratory transport can be used for moving the feedstream along a flow path. As noted above, in the apparatus 100, the vibration of the detection channels 110 also facilitates the settling of the metallic particles towards the gap 120 of the sensors 112, 114, further increasing the likelihood of detecting the particles in either the first or second detection zone 111 and 113. For wet feedstreams, the vibrations may also facilitate more efficient movement of the feedstream through the detection channels 110 and may prevent or reduce target particles from sticking to the electrodes 116, 118 of the sensors 112, 114.

In this embodiment, the vibration mechanism 106 is an electric vibrator motor 126 (hereafter referred to simply as the vibrator 126). Alternatively, the vibration mechanism 106 may be a pneumatic vibrator. The vibrator 126 may provide linear or rotary vibration. The vibrator 126 includes a housing 128 with a linear (flat) base 130. The vibrator 126 may be relatively compact, contributing to the relatively small footprint of the apparatus 100. As one example, the vibrator 126 may be an MVE-Micro electric rotational vibrator with 6-25 kg centrifugal force and 50 Hz input at 30

Watts. In other embodiments, the vibration mechanism 106 may be any other suitable device that can generate vibration and embodiments are not limited to the specific vibrators disclosed herein.

Optionally, the apparatus 100 may further comprise a low-pressure fluid jetting mechanism (not shown). In some embodiments, the fluid jetting mechanism comprises a low-pressure air injector. The fluid jetting mechanism may be positioned below the detection channels 110, and in fluid communication therewith, such that fluid (e.g., air) can be introduced into the feedstream to agitate the particles, thereby further enhancing gravity separation.

Figure 4A:
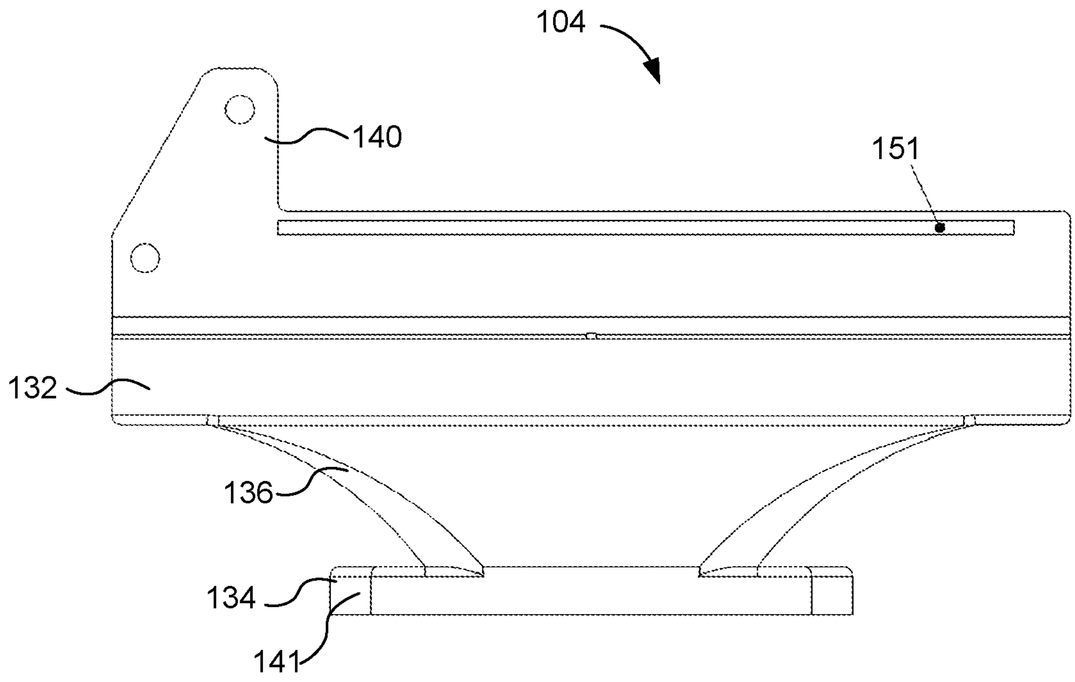
FIGS. 4A and 4B are side and perspective views, respectively, of a body of the apparatus of FIGS. 1A-1C.

The body 104 will be discussed in more detail with reference to FIGS. 4A to 5D. The body 104 interconnects the detection mechanism 102 and the vibration mechanism 106 and transmits the vibrations from the vibrator 126 to the detection channels 110. As shown in FIG. 4A, the body 104 in this embodiment comprises an upper mounting portion 132, a lower mounting portion 134, and an intermediate (middle) portion 136 therebetween.

The upper mounting portion 132 is configured to mount the sensors 112, 114 of the detection mechanism 102. In this embodiment, the upper mounting portion 132 comprises a mounting plate 131. As shown in FIGS. 5A-5D, the mounting plate 131 has a top face 133 that defines a plurality of V-shaped grooves 135. Each groove 135 receives a respective pair of sensors 112, 114 therein, thereby forming a respective detection channel 110 in the form of a V-shaped trough. FIG. 5B shows the grooves 135 with respective sensors 112, 114 received therein (only sensor 114 is visible from the end view).

Figure 5A:
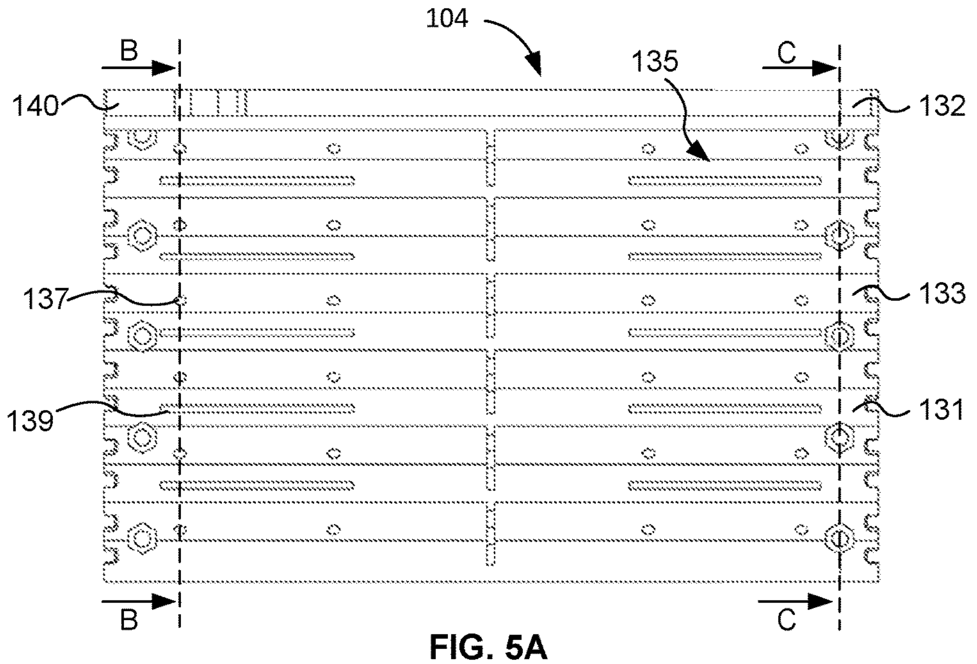
FIG. 5A is a top view of the body of FIGS. 4A-4B.
Figure 5B:
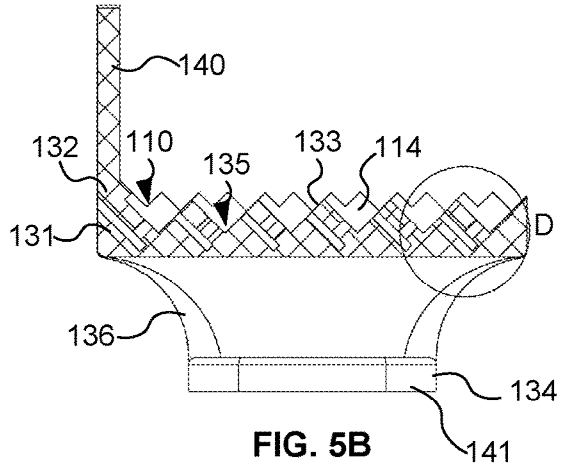
FIG. 5B is a cross-sectional view taken along line B-B in FIG. 5A.
Figure 5C:
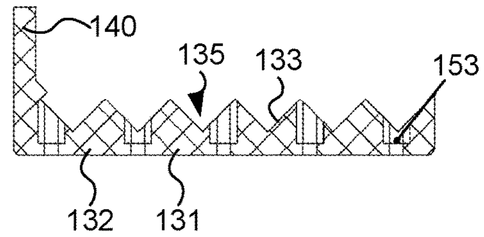
FIG. 5C is a cross-sectional view taken along line C-C in FIG. 5A.
Figure 5D:
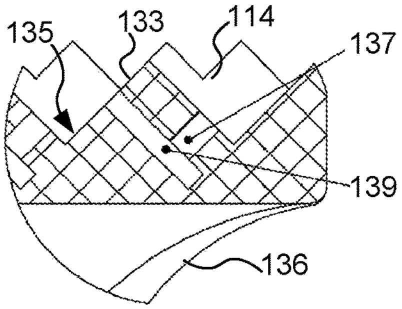
FIG. 5D is an enlarged view of the portion of the body in circle D of FIG. 5B.

Referring to FIGS. 5A and 5D, the mounting plate 131 defines a plurality of angled holes 137 and a plurality of angled slots 139. Each groove 135 has a series of holes 137 spaced along the length of the groove 135 on one side of the "V" and a pair of slots 139 spaced apart along the length of the groove 135 on the opposite side of the "V". When the apparatus 100 is assembled, one slot 139 of each pair aligns with the first sensor 112 and the other slot 139 aligns with the second sensor 114.

To mount a given sensor 112, 114 to the mounting plate 131, the sensor 112, 114 is positioned within a groove 135 and a mounting bracket 124 (shown in FIGS. 2A-2B) is positioned adjacent the sensor 112, 114. Bolts 127 (shown in FIGS. 2A-2B) are inserted through the mounting bracket 124, through the openings 123 of the sensor 112, 114 (shown in FIG. 3C), and into the holes 137. A respective bolt 127 is received in each respective hole 137. A respective fixing plate (not shown) is also inserted into each slot 139 to engage the underside of the sensor 112, 114. In other embodiments, the sensors 112, 114 may be mounted to the body 104 in any other suitable manner.

Figure 4B:
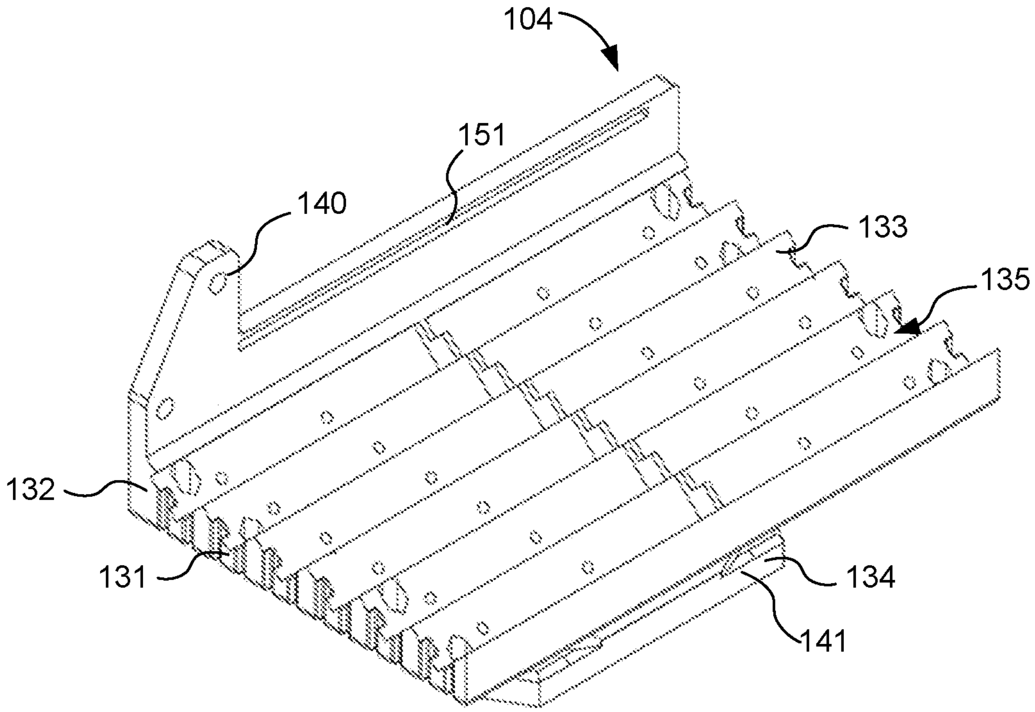

The upper mounting portion 132 may further comprise side rails 140, extending upwards from the mounting plate 131 on either side of the detection channels 110. The side rails 140 may be used to connect the body 104 to the flow direction mechanism 108, as described in more detail below. One or both of the side rails 140 may be integral with the mounting plate 131 or may be coupled thereto by any suitable coupling means. In the embodiment shown in FIGS. 4A to 5D, one side rail 140 is integral with the body 104 and the other side rail 140 (visible in FIGS. 1A-1C) is coupled to the body 104 by bolts or any other suitable coupling means. As shown in FIGS. 4A and 4B, each side rail 140 may also comprise a respective groove 151 on an inner surface thereof. The grooves 151 may be used to mount the cover 129 (if used) to the body 104.

In some embodiments, the upper mounting portion 132 is coupled to at least one dampening plate. As shown in FIG. 2A-2B, the upper mounting portion 132 is coupled to first and second dampening plates 152 and 154 in this embodiment. The first dampening plate 152 is proximate the inlet end 103 of the detection mechanism 102 and the second dampening plate 154 is proximate the outlet end 105. The dampening plates 152, 154 are positioned below the mounting plate 131 and extend laterally outwards from the side rails 140 of the body 104. The mounting plate 131 may define a series of holes 153 (visible in FIG. 5C) to receive bolts therethrough (not shown) to couple the mounting plate 131 to a given dampening plate 152, 154. In other embodiments, the dampening plates 152, 154 may be coupled to the body 104 by any other suitable means.

Each dampening plate 152, 154 may further comprise dampening couplers 156 at opposed ends thereof that can be used to couple the apparatus 100 to a mounting plate of a system (such as the mounting plates 206A-D of the system 200, discussed below). The dampening couplers 156 may dampen the transmission of vibration from the vibrator 126 to other components of the system.

Referring now to FIGS. 1B and 4A, the lower mounting portion 134 of the body 104 is configured to engage the base 130 of the vibrator 126. The lower mounting portion 134 may be approximately the length and width of the base 130. In other embodiments, the lower mounting portion 134 may be any other suitable dimension. In this embodiment, the lower mounting portion 134 comprises an approximately linear (flat) plate 141. The plate 141 is coupled to the base 130 of the vibrator 126 via bolts (not shown) or any other suitable coupling means.

The intermediate portion 136 tapers downward (and inward) from the upper mounting portion 132 to the lower mounting portion 134 such that the intermediate portion 136 has an approximately frusto-conical profile and the body 104 has an overall "wine glass" shape. The sides of the intermediate portion 136 curve inward to provide a smoother transition from the upper mounting portion 132 to the lower mounting portion 134.

The shape of the body 104 is configured to transmit a particular frequency and/or amplitude of vibration from the vibrator 126 to the detection channels 110. The body 104 in this embodiment is also configured to provide vibrational homogeneity across the detection channels 110. As used herein, "vibrational homogeneity", "vibrational continuity", and "uniform seismic transmissibility" are used interchangeably to refer to approximately equal vibrational frequency and amplitude across all of the detection zones of the detection channels 110 (i.e., across the full length and width of the detection channels 110). Vibrational homogeneity of the body 104 ensures approximately uniform vibration across all of the detection zones of the detection channels 110 at a desired frequency to enhance settling of the metallic particles and contact with the sensors 112, 114. Uniform vibration may also facilitate the uniform flow of each portion of feedstream through each of the six detection channels 110.

In some embodiments, the vibrational homogeneity is provided by forming the body 104 as a unitary structure with homogenous surfaces. As used herein, "unitary" refers to a single, integral structure formed or composed of a material without any joints or seams. The unitary body may also be referred to as a "monolithic" body. The side rails 140 may be part of the unitary body 104 or may be separate components coupled thereto. As used herein, "homogenous" refers to smooth, uniform surfaces without any substantial interruptions or discontinuities such as protrusions or gaps. However, it will be understood that homogenous surfaces may not be perfectly uniform and may still have minor flaws and irregularities.

Figure 4C:
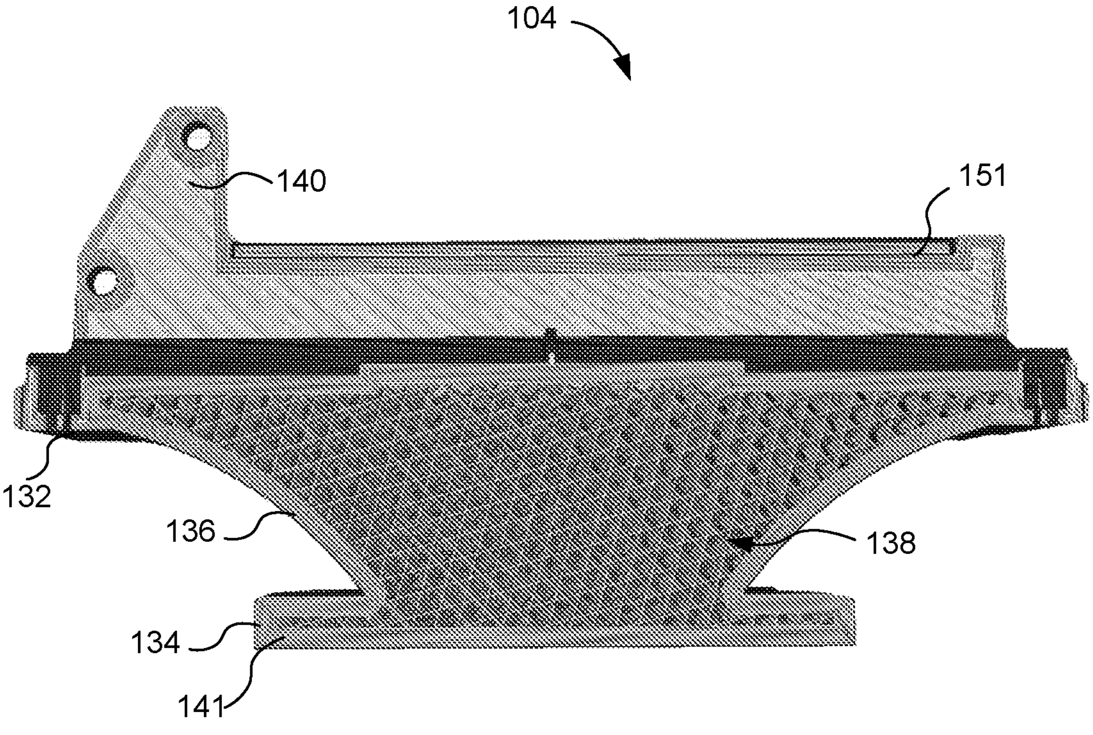
FIG. 4C is a side view of an infill pattern for three-dimensional printing of the body of FIGS. 4A and 4B.

In some embodiments, the body 104 is formed as a unitary structure with homogenous surfaces via three-dimensional (3D) printing. In some embodiments, the body 104 is formed such that the interior of the body 104 is at least partially hollow. FIG. 4C is a side view of an infill pattern for 3D printing of the body 104. In this embodiment, the intermediate portion 136 of the body 104 has an internal honeycomb structure 138. The honeycomb structure 138 may allow for decreased weight of the body 104 and more even cooling through the cross-section when the body 104 is formed by 3D-printing. In some embodiments, the honeycomb structure 138 may extend at least partially into the upper mounting portion 132 and/or the lower mounting portion 134.

Although one particular embodiment of the body 104 is shown in FIGS. 1A-1C and 4A-5D, it will be understood that the shape and size of the body 104 may be adjusted to accommodate a different number or size of detection channels, a different type of sensor, a different type of vibration mechanism, etc., while still maintaining the vibrational characteristics described above.

Figure 6:
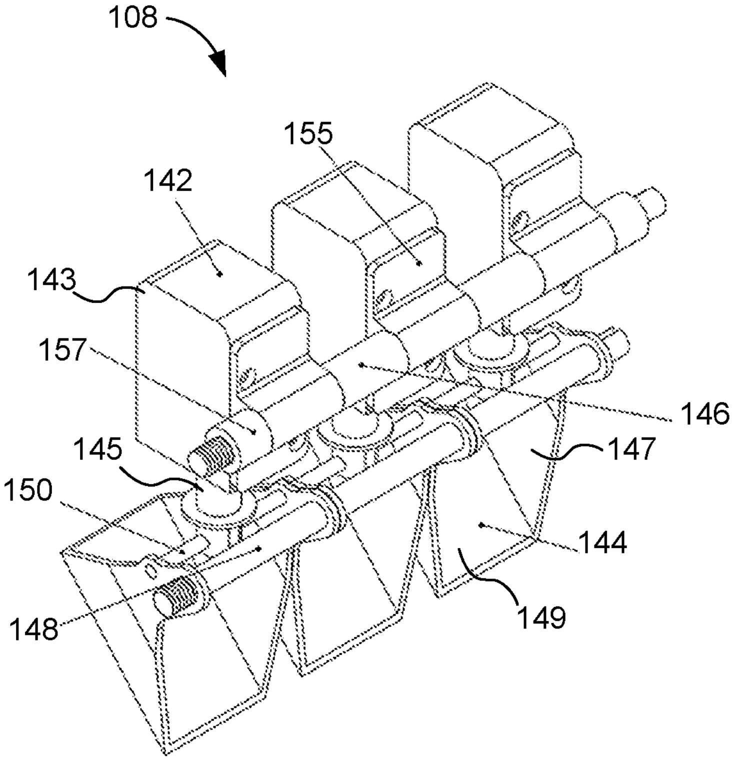
FIG. 6 is a perspective view of the flow direction mechanism of the apparatus of FIGS. 1A-1C.
Figure 7:
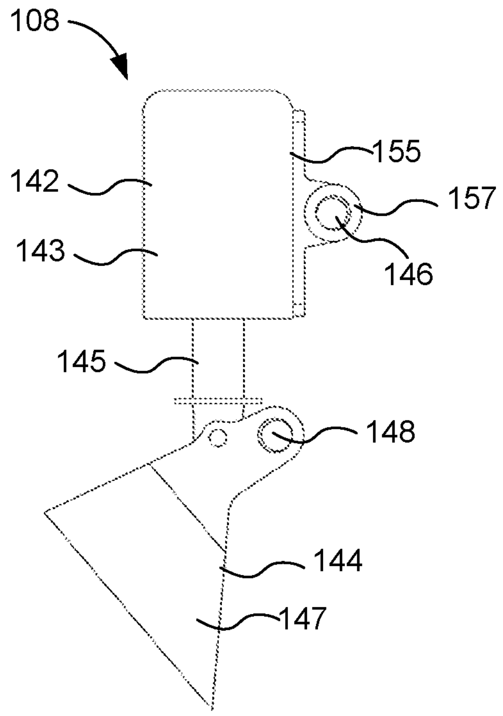
FIG. 7 is a side view of the flow direction mechanism of FIG. 6.

The flow direction mechanism 108 will be discussed in more detail with reference to FIGS. 6 and 7. The flow direction mechanism 108 is configured to direct the flow of the feedstream exiting from the detection channels 110 at the outlet end 105 of the detection mechanism 102. The flow direction mechanism 108 may also be referred to as an "ejection mechanism". The flow direction mechanism 108 may be coupled directly or indirectly to the body 104 of the apparatus 100. In this embodiment, the flow direction mechanism 108 is coupled directly to the body 104 via the side rails 140.

The flow direction mechanism 108 may comprise at least one actuator 142 and at least one flow director 144. In this embodiment, the flow direction mechanism 108 comprises three actuators 142 and three flow directors 144, each flow director 144 actuated by a respective actuator 142. The three actuators 142 are coupled to an upper rod 146 and the three flow directors 144 are rotatably coupled to a lower rod 148. The upper and lower rods 146 and 148 are mounted to the side rails 140 of the body 104 at the outlet end 105 of the detection mechanism 102.

Each actuator 142 comprises a head 143, a vertical shaft 145 extending downwards from the head 143, and a horizontal pin 150 extending outwards from either side of the shaft 145. The head 143 houses a driving mechanism (not shown) that drives rotation of the pin 150 with respect to the shaft 145. In this embodiment, the heads 143 are coupled to the upper rod 146 via brackets 155 and bushings 157. In other embodiments, the heads 143 may be coupled to the upper rod 146 by any other suitable means.

The flow directors 144 may be in the form of a basket, cup, flapper, etc. In this embodiment, each flow director 144 is approximately U-shaped with opposed side walls 147 and a bottom wall 149. In this embodiment, the bottom wall 149 is flat. In other embodiments, the bottom wall 149 may be curved such that the side walls 147 and the bottom wall 149 for an approximately continuous U-shape. Each flow director 144 is coupled to its respective actuator 142 via that actuator's pin 150 that extends through the side walls 147 of the flow director 144. Rotation of the pin 150 drives rotation of the flow director 144 about the lower rod 148. Each flow director 144 is rotatable between a first position in which the bottom wall 149 is generally vertical (as shown in FIGS. 1A and 1B) and a second position in which the flow director 144 is angled from vertical (as shown in FIG. 7).

Each flow director 144 is associated with at least one detection channel 110. In this embodiment, each flow director 144 is approximately aligned with two adjacent detection channels 110 and configured to direct the flow of the portions of the feedstream exiting therefrom. When a given flow director 144 is in the first position, the portions of the feedstream exiting the two adjacent detection channels 110 are directed directly generally downwards. When the flow director 144 is in the second position, the exiting feedstream portions are directed at an angle. The flow director 144 is actuated between the first and second positions by its respective actuator 142. The actuator 142 is operatively connected to the sensors 112, 114 of the two adjacent detection channels 110 (e.g., via a controller, as discussed below) and is operable to actuate the flow director 144 responsive to output of the sensors 112, 114 indicating the presence (or absence) of targeted metallic particles. If the target particles are present, the portions of the feedstream in the two adjacent detection channels 110 are directed to a concentrate stream (not shown). If the target particles are not present, those portions of the feedstream are directed to a residual stream (not shown). Depending on the position of the apparatus 100 in the overall system (such as system 200 discussed below), either the first or second position of the flow director 144 will correlate with the concentrate stream and the other position will correlate with the residual stream. In this embodiment, each of the three actuators 142 independently actuates its respective flow director 144 such that some portions of the same feedstream are directed to the concentrate stream while other portions are directed to the residual stream.

Other variations are also possible. In some embodiments, the flow direction mechanism 108 may comprise any other suitable number of actuator/flow director pairs. For example, the flow direction mechanism 108 may alternatively comprise six actuator/flow director pairs, one for each detection channel 110. In other embodiments, the apparatus 100 may comprise any other suitable flow direction mechanism.

In some embodiments, the apparatus 100 further comprises a controller. The controller may be operatively connected to the sensors 112, 114 and the flow direction mechanism 108 such that the controller actuates the flow direction mechanism 108 responsive to output from the sensors 112, 114. The controller may also be operatively connected to the vibration mechanism 106 to control the operation thereof. An example controller 240 is discussed in more detail below with reference to FIG. 12 as part of the system 200. Although the controller 240 is described as controlling multiple apparatuses 100 in the system 200, it will be understood that the controller 240 can be used to control a single apparatus 100.

Therefore, the apparatus 100 in this embodiment is a single, discrete unit that combines detection channels, a vibration mechanism, and a flow direction mechanism. The apparatus 100 thus has a much smaller footprint than conventional devices. The apparatus 100 can also be used as an individual detection module in an overall system, such as the system 200 discussed below.

An example system 200 including the apparatus 100 will be discussed with reference to FIGS. 8 to 11. The system 200 will be discussed with reference to an aggregate ore feedstream containing metallic particles; however, it will be understood that the system 200 can be adapted for use with other feedstreams and other target particles.

The system 200 is modular with each module comprising an individual apparatus 100. The system 200 in this embodiment comprises a first, second, third, and fourth apparatus 100A, 100B, 100C, and 100D for a total of four modules. In other embodiments, the system 200 can comprise any other suitable number of apparatuses/modules.

Figure 8:
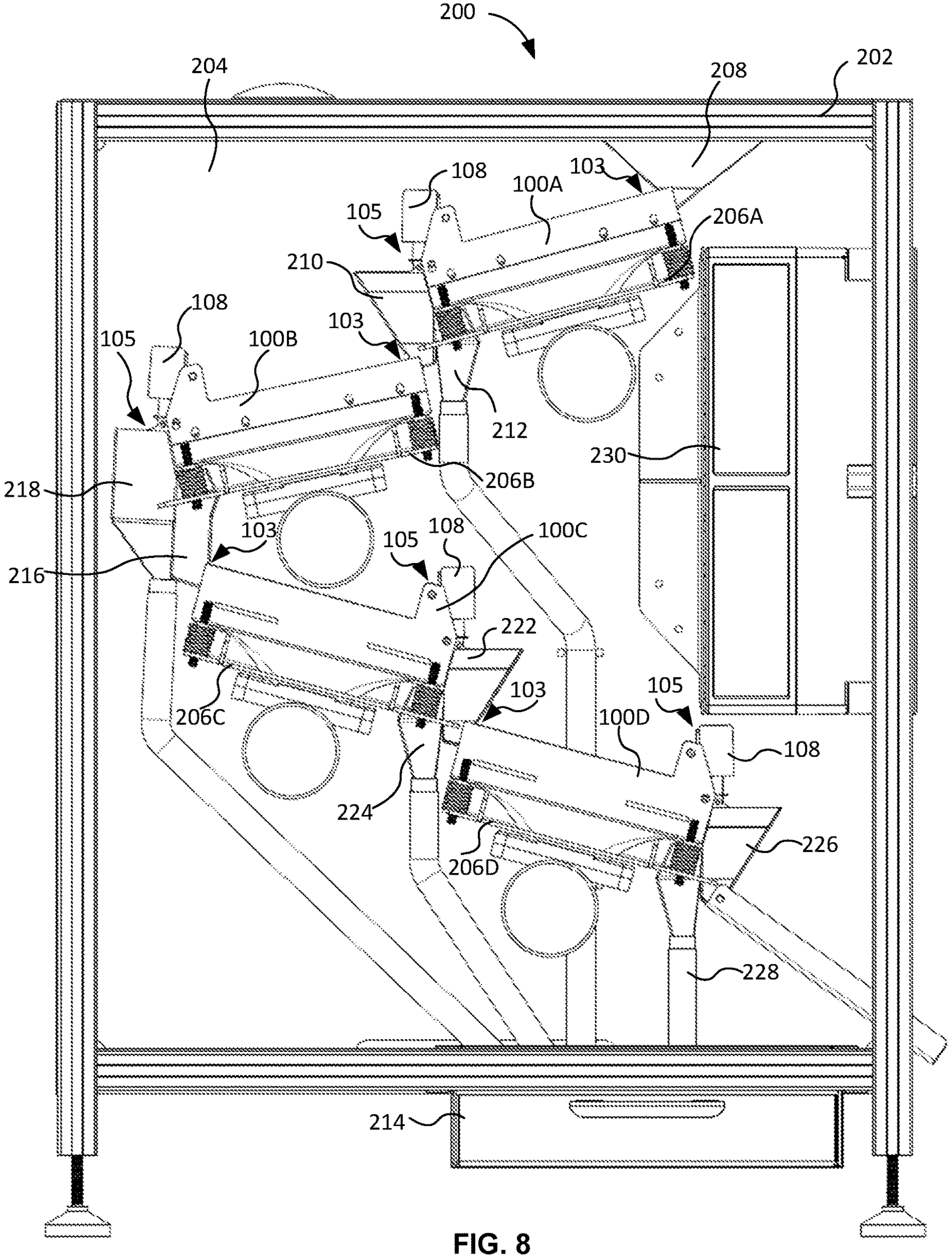
FIG. 8 is a side view of an example system including the apparatus of FIGS. 1A-1C, according to some embodiments.
Figure 9:
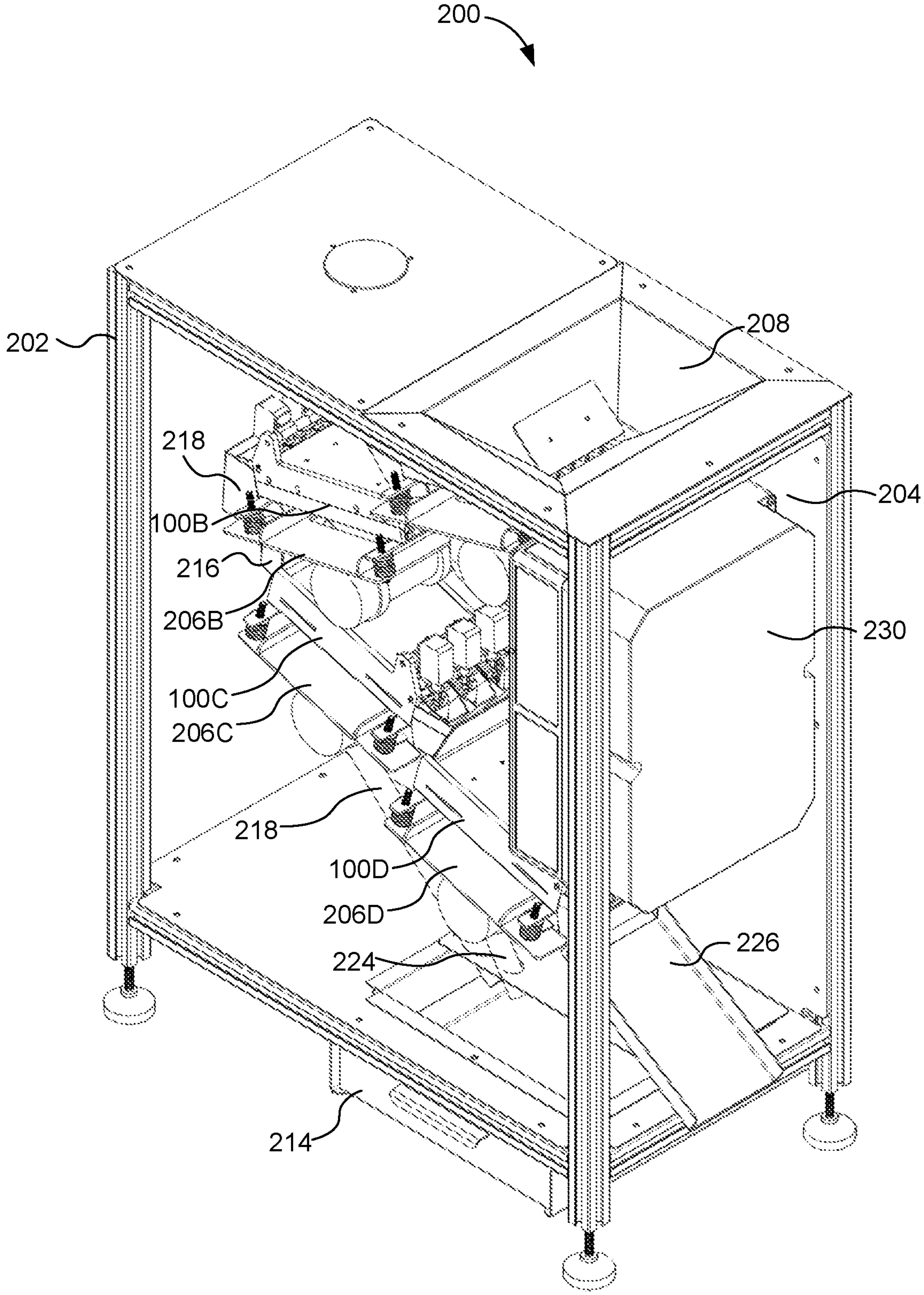
FIGS. 9 and 10 are perspective views of the system of FIG. 8.

Referring to FIG. 8, the system 200 comprises a suitably sized frame 202 with a mount positioning wall 204 along one side thereof. The first, second, third, and fourth apparatuses 100A, 100B, 100C, and 100D are each mounted to the mount positioning wall 204 via respective mounting plates 206A, 206B, 206C, and 206D. As can be seen in FIG. 8, each mounting plate 206A-206D is positioned at an angle from horizontal such that each apparatus 100A-100D is also angled from horizontal. Each apparatus 100A-100D is positioned such that the inlet end 103 of the detection mechanism 102 is above its outlet end 105 (the inlet and outlet ends 103, 105 of the apparatuses 100A-100D are labeled in FIG. 8 but omitted from FIGS. 9-11 for simplicity). The angle of the apparatuses 100A-100D facilitates the flow of the feedstream through the detection channels 110 towards the flow direction mechanism 108.

Figure 10:
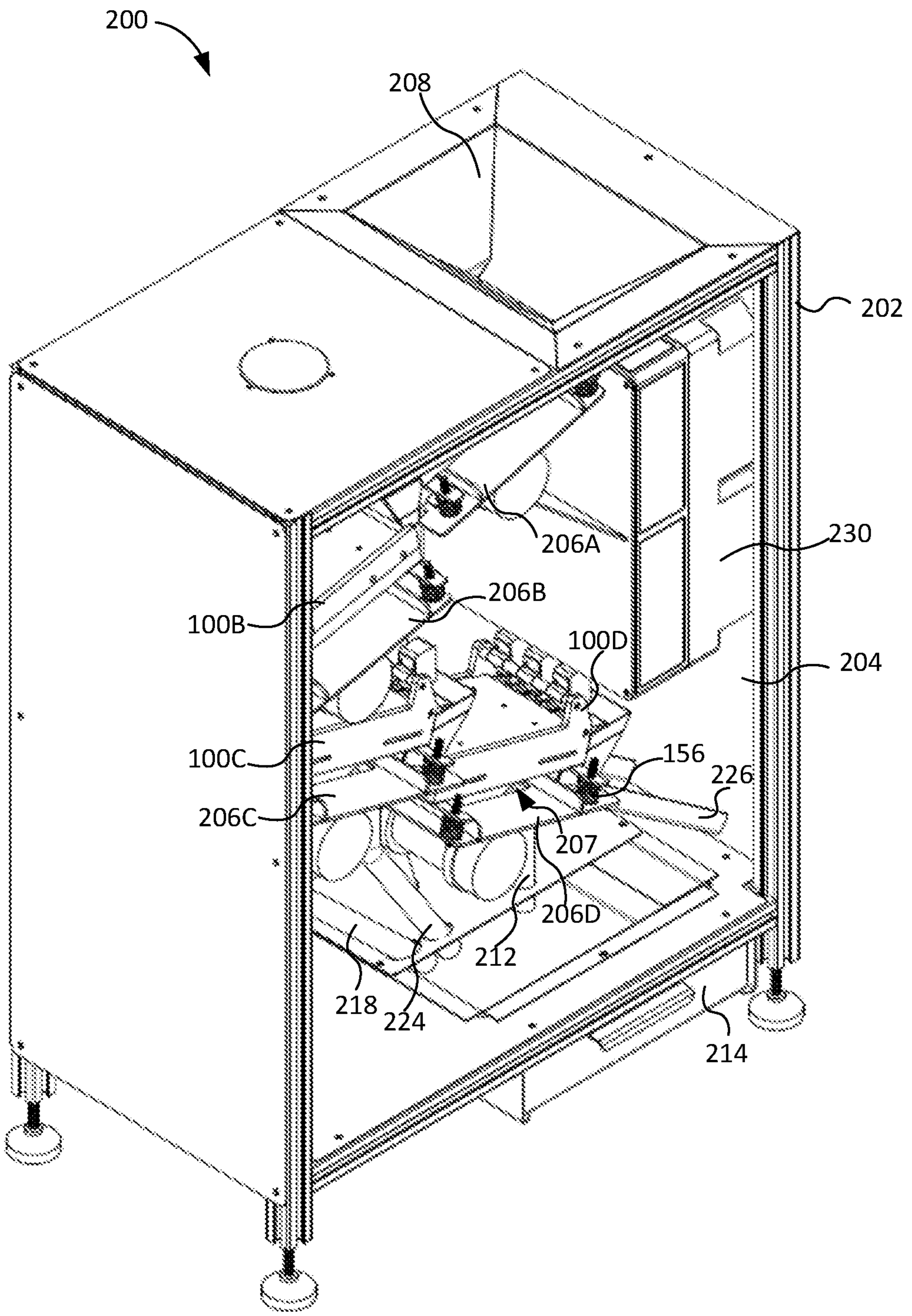
Figure 11:
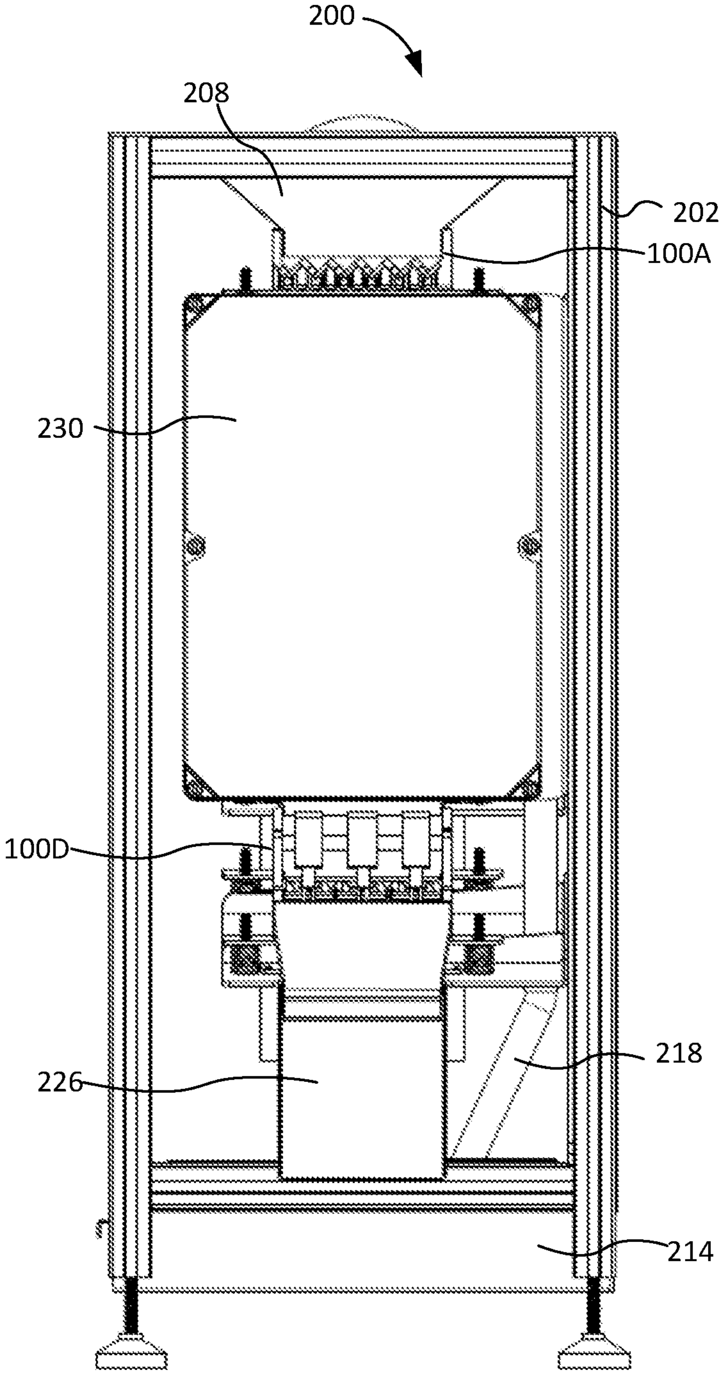
FIG. 11 is a rear view of the system of FIG. 8.

Referring to FIG. 10 and using the fourth mounting plate 206D as an example, the mounting plate 206D comprises an opening 207 extending therethrough. The apparatus 100D is received through the opening 207 such that the intermediate portion 136 of the body 104 is positioned in the opening 207. In this position, the detection channels 110 are above the mounting plate 206A and the vibrator 126 is below. The upper mounting portion 132 of the apparatus 100D is coupled to the mounting plate 206D via the dampening couplers 156. As discussed above, the dampening couplers 156 reduce the transfer of vibration between the apparatus 100D and the mounting plate 206D (and thus the system 200 as a whole).

Referring again to FIG. 8, the system 200 further comprises an inlet hopper 208 positioned proximate the top of the frame 202. The inlet hopper 208 is configured to receive the feedstream (not shown) and deliver the feedstream to the first apparatus 100A.

The second apparatus 100B is positioned in line with and below the first apparatus 100A. A transfer hopper 210 is positioned between the first apparatus 100A and the second apparatus 100B, below the flow direction mechanism 108 of the first apparatus 100A. The transfer hopper 210 is configured to receive feedstream from the first apparatus 100A and deliver the feedstream to the second apparatus 100B.

A first product chute 212 is positioned adjacent to the transfer hopper 210 and below the flow direction mechanism 108 of the first apparatus 100A. The product chute 212 extends from the first apparatus 100A to a product basin 214. When a given flow director 144 of the first apparatus 100A is in the first position (i.e., vertical), that portion of the feedstream is directed into the transfer hopper 210 and flows into the second apparatus 100A. When a given flow director 144 is in the second position (i.e., angled), that portion of the feedstream is directed into the product chute 212 and flows into the product basin 214.

The third apparatus 100C is positioned below the second apparatus 100B in the reverse orientation. By reversing the orientation of the third apparatus 100C, the system 200 has an overall smaller footprint than if the third apparatus 100C was positioned in line with the second apparatus 100B. A reverse transfer hopper 216 is positioned between the second apparatus 100B and the third apparatus 100C, below the flow direction mechanism 108 of the second apparatus 100B. The reverse transfer hopper 216 is configured to receive feedstream from the second apparatus 100B and deliver it to the third apparatus 100C.

A reverse product chute 218 is positioned adjacent to the reverse transfer hopper 216 and below the flow direction mechanism 108 of the second apparatus 100B. The reverse product chute 218 extends from the second apparatus 100B to the product basin 214. When a given flow director 144 of the second apparatus 100B is in the first position (i.e., vertical), that portion of the feedstream is directed into the reverse product chute 218 and flows into the product basin 214. When a given flow director 144 is in the second position (i.e., angled), that portion of the feedstream is directed into the reverse transfer hopper 216 and flows into the third apparatus 100C.

The fourth apparatus 100D is positioned in line and below the third apparatus 100C. A second transfer hopper 222 and a second product chute 224 are positioned between the third and fourth apparatuses 100C, 100D, below the flow direction mechanism 108 of the third apparatus 100C. The product chute 224 extends into the product basin 214. The third apparatus 100C functions similarly to the first apparatus 100A. When a given flow director 144 is in the first position (i.e., vertical), that portion of the feedstream is directed into the transfer hopper 222 and flows into the fourth apparatus 100D. When a given flow director 144 is in the second position (i.e., angled), that portion of the feedstream is directed into the product chute 224 and flows into the product basin 214.

A tailings chute 226 and a third product chute 228 are positioned below the flow direction mechanism 108 of the fourth apparatus 100D. The product chute 228 extends into the product basin 214. The fourth apparatus 100D functions similarly to the first and third apparatuses 100A and 100C. When a given flow director 144 is in the first position (i.e., vertical), that portion of the feedstream is directed into the tailings chute 226. When a given flow director 144 is in the second position (i.e., angled), that portion of the feedstream is directed into the product chute 228 and flows into the product basin 214. In this embodiment, the products chutes 212, 218, 224, and 228 all extend directly into the product basin 214. In other embodiments, one or more of the products chutes 212, 218, 224, and 228 may connect with one of the other product chutes 212, 218, 224, and 228 or may connect to a common product pipe (not shown) that in turn extends into the product basin 214.

Figure 12:
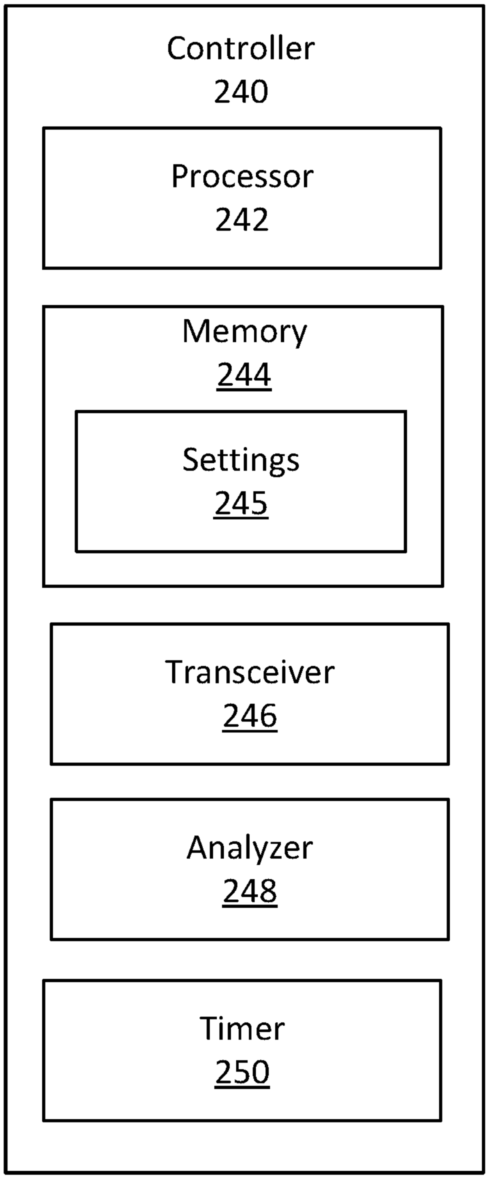
FIG. 12 is a block diagram of a controller of the system of FIG. 8.

The system 200 may further comprise a control panel 230 housing a controller. FIG. 12 is a block diagram of an example controller 240. The controller 240 may comprise at least one processor 242 and a memory 244. The memory 244 stores processor-executable instructions therein that, when executed, cause the processor(s) to implement one or more processes described herein. The memory 244 may store settings 245, including a threshold for the detection signal as discussed below.

In some embodiments, the controller 240 further comprises a transceiver 246 operatively connected to the processor 242. The transceiver 246 may be configured to send and receive communications over a communication network. The communication network may comprise a wired or a wireless network. The transceiver 246 may comprise a separate transmitter and receiver or both a transmitter and a receiver sharing common circuitry. The transceiver 246 may be configured for short-range communication and/or long-range communication. For short-range communication, the transceiver 246 may comprise, for example, a Bluetooth transceiver. For long range communications, the transceiver 246 may comprise a transceiver configured to send and receive communications over a communication network such as the Internet. Thus, the controller 240 may be configured to communicate with a remote device, such as a personal computer, laptop, mobile phone, smart phone, etc., thereby allowing for remote monitoring and/or control of the system 200.

The controller 240 is operatively connected to each of the apparatuses 100A-100D and operative to send and receive signals therewith. For example, the controller 240 may be connected to each of the apparatuses 100A-100D by electrical cables. The controller 240 may be configured to receive a detection signal from each of the sensors 112, 114 of the six detection channels 110. The detection signal may comprise electrical voltage, current, resistance, etc. resulting from the completion of the circuit across the gap 120 between the electrodes 116, 118 of one of the sensors 112, 114. In some embodiments, the controller 240 may further comprise at least one analyzer 248 in communication with the processor 242 to convert the signal to data readable by the processor 242. For example, the analyzer 248 may comprise an oscilloscope, an ammeter, a multimeter, etc. or a combination thereof.

The controller 240 may also be configured to send a triggering signal to each of the actuators 142 of the respective flow direction mechanisms 108 of the apparatuses 100A-100D. The triggering signal may be sent to a given actuator 142 responsive to the controller 240 receiving a detection signal from one of the detection channels 110 in line with that actuator 142. In some embodiments, the triggering signal is sent as soon as the detection signal is received, indicating the presence of target particles in that portion of the feedstream. In other embodiments, the triggering signal is sent when the detection signal reaches a pre-determined threshold (stored in the settings 245), indicating a certain percentage of target particles in that portion of the feedstream. The triggering signal then actuates that actuator 142 to move its corresponding flow director 144 from the first position to the second position, or vice versa. When the detection signal is no longer detected (indicating the absence of target particles in that portion of the feedstream), the controller 240 may actuate the actuator 142 back to its previous position.

In some embodiments, the triggering signal is sent to the actuator 142 as soon as the detection signal is detected and the flow director 144 ejects the feedstream (i.e., directs the feedstream into one of the product chutes 212, 218, 224, 228) until the detection signal is no longer detected. In other embodiments, the controller 240 further comprises a timer 250 that is initiated when the detection signal is detected (t=0) and the triggering signal is sent to the actuator 142 at t+n, where n is selected based on the velocity of the feedstream and the length of the detection channels 110. The flow director 144 then immediately reverts back to its previous position. In these embodiments, only a portion of the feedstream containing the detected particle is ejected, which minimizes gangue recovery.

In some embodiments, the controller 240 is also operatively connected to each of the vibrators 126 to control the operation thereof. For example, the controller 240 may be used to turn the vibrators 126 on and off as needed. In some embodiments, the controller 240 may also be used to adjust the vibrational frequency and amplitude of the vibrations.

The system 200 may further comprise at least one power source (not shown). The power source is operatively connected to the sensors 112, 114, the vibrator 126, the actuators 142, and the controller 240 to supply power thereto. In some embodiments, the power source comprises one or more solar panels. In other embodiments, the power source may comprise one or more batteries, electrical generators, or any other suitable power source. By providing an independent power source as part of the system 200, the system 200 may operate in remote environments where a commercial utility grid is not available. Alternatively, or additionally, if a commercial grid is available, the system 200 may be connected thereto.

In operation, a feedstream containing target particles may be fed into the system 200 via the inlet hopper 208. The feedstream will flow into the first apparatus 100A as six individual portions that flow through the six detection channels 110. The detection channels 110 will be vibrated by vibrations transmitted to the detection channels 110 from the vibrator 126 through the body 104. As noted above, the body 104 may provide vibrational homogeneity across the detection channels 110.

As a portion of feedstream passes through the first detection zone 111 of a given detection channel 110, target particles will settle downwards towards the first sensor 112. One or more particles may contact the gap 120 between the electrodes 116, 118 of the first sensor 112, thereby completing the circuit and generating a detection signal. The detection signal is then received by the controller 240, which sends a triggering signal to the appropriate actuator 142 aligned with that detection channel 110. The actuator 142 will then move its corresponding flow director 144 from the first (vertical) position to the second (angled) position. Alternatively, if no particles contact the first sensor 112, then no detection signal is generated, and the feedstream portion continues on to the second detection zone 113. Here, the flow of the feedstream and vibrations of the vibrator 126 may shift target particles further downward and one or more particles may contact the gap 120 between the electrodes 116, 118 of the second sensor 114. The second sensor 114 may thereby generate a detection signal, causing the controller 240 to actuate the actuator 142 to move the flow director 144 to the second position. With the flow director 144 in the second position, that portion of the feedstream will be directed into the product chute 212 and will flow into the product basin 214.

If that portion of the feedstream passes through both the first and second detection zones 111, 113 without any particles contacting the first or second sensors 112, 114, then no detection signal will be generated and no triggering signal will be sent to the actuator 142. The flow director 144 will thereby remain in the first position (or move back into the first position if it was previously in the second position) and that portion of the feedstream will be directed to the transfer hopper 210.

The same process will occur at each of the six detection channels 110, causing the three flow directors 144 to be actuated accordingly. The portion of feedstream moving to the product basin 214 will be referred to as the concentrate stream and the portion of feedstream moving to the transfer hopper 210 will be referred to as the residual stream.

The residual stream received by the transfer hopper 210 will flow into the second apparatus 100B. A similar process will occur in the second apparatus 100B as in the first apparatus 100A, but with the flow directors 144 moving in the opposite direction. In other words, when a detection signal is generated from one of the detection zones 111, 113 of a given detection channel 110, a triggering signal will be sent to the appropriate actuator 142 to move the flow director 144 from the second (angled) position into the first (vertical) position. That portion of feedstream will thereby be directed into the reverse product chute 218 and will flow through the product collection pipe 220 to the product basin 214. If no detection signal is generated, the flow director 144 will remain in the second position (or move to that position from the first position), and that portion of the feedstream will be directed into the reverse transfer hopper 216.

The residual stream received by the reverse transfer hopper 216 will flow into the third apparatus 100C. A similar process will occur in the third apparatus 100C as in the first apparatus 100A and a concentrated stream will flow into the product chute 224 and a residual stream will flow into the transfer hopper 222.

The residual feedstream received by the transfer hopper 222 will flow into the fourth apparatus 100D. A similar process will occur in the fourth apparatus 100D as in the first and third apparatuses 100A and 100C and a concentrated stream will flow into the product chute 228 and a residual stream will flow into the tailings chute 226.

Thus, the product basin 214 will receive the concentrate streams from all of the apparatuses 100A-100D and only the remaining residual stream will exit the system 200 as a tailings stream.

Although one particular configuration of the system 200 is shown in FIGS. 8-11, embodiments are not limited to this configuration. The system 200 may be adapted to include more or fewer apparatuses. Moreover, the flow direction mechanisms 108 provide flexibility for each apparatus 100 to be oriented in either direction and, thus, the apparatuses can be arranged in any suitable arrangement with any suitable hoppers, chutes, etc.

Figure 13:
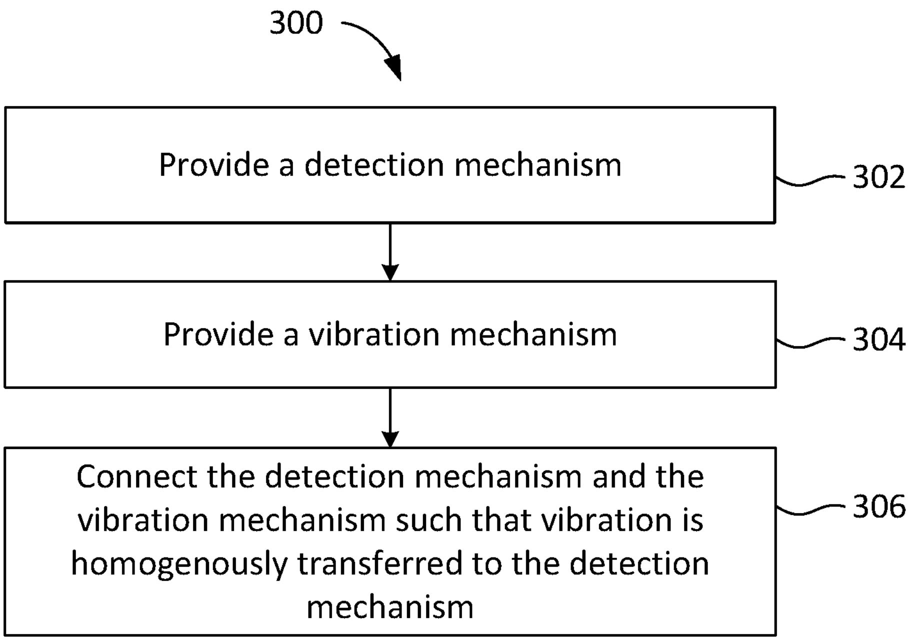
FIG. 13 is a flowchart of a method for making an apparatus, according to some embodiments.

FIG. 13 is a flowchart of an example method 300 for making an apparatus for selecting target particles from a feedstream, according to some embodiments.

At block 302, a detection mechanism is provided. The term "providing" in this context refers to making, manufacturing, receiving, or otherwise obtaining a component of the apparatus. The detection mechanism may have any of the features of the detection mechanism 102 of the apparatus 100, as described above. In some embodiments, the detection mechanism comprises at least one detection channel, each detection channel having at least two in-line detection zones.

At block 304, a vibration mechanism is provided. The vibration mechanism may comprise an electric vibrator motor or any other suitable device or system that generates vibrations. The vibration mechanism may have any of the features of the vibration mechanism 106 of the apparatus 100.

At block 306, the detection mechanism is connected to the vibration mechanism such that vibration is homogenously transferred from the vibration mechanism to the detection mechanism. In some embodiments, the method 300 further comprises providing a body having vibrational homogeneity and the detection mechanism and the vibration mechanism are connected via the body. The body may have any of the features of the body 104 of the apparatus 100. In some embodiments, providing the body comprises forming the body by 3D-printing. In other embodiments, the body may be provided by any other suitable means.

In some embodiments, the method 300 further comprises providing a flow direction mechanism and connecting the flow direction mechanism to the body. The flow direction mechanism may have any of the features of the flow direction mechanism 108 of the apparatus 100. The flow direction mechanism may be connected to the body such that the flow direction mechanism is adjacent to the detection channel(s) of the detection mechanism.

Figure 14:
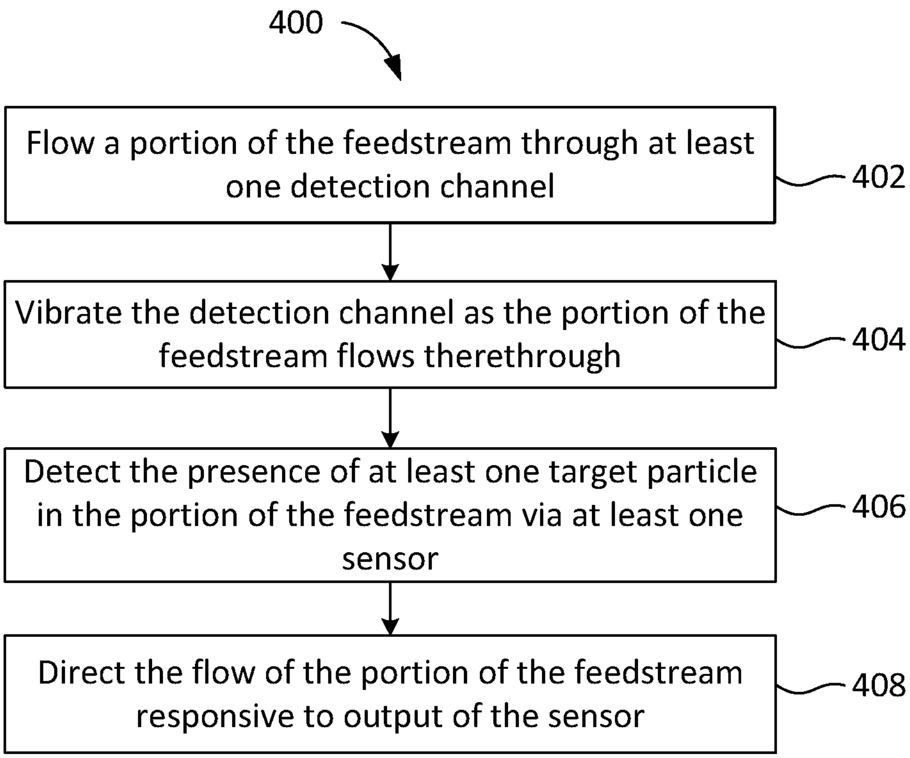
FIG. 14 is a flowchart of a method for selecting target particles from a feedstream, according to some embodiments.

FIG. 14 is a flowchart of an example method 400 for selecting target particles from a feedstream. The method 400 may be implemented by the apparatus 100 and the system 200.

At block 402, a portion of the feedstream is flowed through at least one detection channel, the at least detection channel comprising at least one sensor capable of detecting the target particles. In some embodiments, the feedstream is flowed through two or more discrete detection zones within the same detection channel, each detection zone comprising a respective sensor. In some embodiments, respective portions of feedstreams are flowed through a plurality of parallel detection channels. The detection channel and sensor may have any of the features of the detection channel 110 and the sensors 112, 114 of the apparatus 100 as described above.

At block 404, each detection channel is vibrated, via a vibration mechanism, as the portion of the feedstream flows therethrough, wherein vibrations are homogenously transferred from the vibration mechanism to the detection channel. The vibrations may be homogenously transferred via a unitary body with homogenous surfaces interconnecting the vibration mechanism and the detection channel. The unitary body may have any of the features of the body 104 of the apparatus 100 discussed above.

Although block 404 is shown in FIG. 14 as being below block 402, it will be understood that the steps in blocks 402 and 404 occur simultaneously in most embodiments.

At block 406, the presence of at least one target particle in the portion of the feedstream is detected via at least one sensor of each detection channel. If target particles are present, a detection signal may be sent from the sensor(s) to a controller. In embodiments in which the detection channel comprises two or more detection zones, the target particles may be detected by the sensor in both detection zones or in just one of the detection zones.

At block 408, the flow of the portion of the feedstream is directed responsive to the output of the sensor(s). If target particles are detected in the feedstream, that portion of the feedstream may be directed to a concentrate stream. If target particles are not detected, that portion of the feedstream may be directed to a residual stream. The flow of the feedstream may be directed via a flow direction mechanism. The flow direction mechanism may have any of the features of the flow direction mechanism 108 of the apparatus 100. In some embodiments, the flow direction mechanism comprises two or more independently actuatable flow directors, each flow director associated with one or more detection channels. In these embodiments, the method 400 may further comprise independently directing the flow of different portions of the feedstream to the concentrate stream or residual stream as appropriate.

In some embodiments, the method 400 may further comprise directing the residual stream to a detection channel of another apparatus and repeating the steps at blocks 402 to 408 as described above. The method 400 may further comprise collecting the concentrate stream from each apparatus as an overall product stream.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An apparatus for selecting target particles from a feedstream, comprising:

at least one detection channel, each detection channel defining a respective flow path for a portion of the feedstream and comprising at least one sensor capable of detecting the target particles;

a vibration mechanism that vibrates the at least one detection channel;

a body interconnecting the at least one detection channel and the vibration mechanism, the body providing vibrational homogeneity across the at least one detection channel, wherein the body is formed by three-dimensional printing; and a flow direction mechanism that directs the flow of the portion of the feedstream as it exits the at least one detection channel.

2. The apparatus of claim 1, wherein the body is a unitary structure with homogenous surfaces.

3. The apparatus of claim 1, wherein a middle portion of the body has a frusto-conical profile.

4. The apparatus of claim 1, wherein at least a portion of the body has an internal honeycomb structure.

5. The apparatus of claim 1, wherein the at least one sensor comprises a first electrode and a second electrode spaced by a gap therebetween, wherein the presence of the target particles is detected when one or more of the target particles straddles the gap.

6. The apparatus of claim 5, wherein the at least one sensor further comprises an insulating spacer disposed in the gap between the first electrode and the second electrode.

7. The apparatus of claim 5, wherein the at least one detection channel is a V-shaped trough, and wherein the gap between the first electrode and the second electrode is positioned at an apex of the V-shaped trough.

8. The apparatus of claim 1, wherein the at least one detection channel comprises a first detection zone in-line with a second detection zone, each of the first and second detection zones comprising a respective sensor of the at least one sensor.

9. The apparatus of claim 8, wherein the at least one detection channel comprises two or more adjacent detection channels parallel to one another, wherein each of the two or more adjacent detection channels comprises a respective first detection zone and second detection zone.

10. The apparatus of claim 1, wherein the flow direction mechanism comprises at least one actuator and at least one flow director, wherein each actuator actuates a respective flow director between a first position and a second position to direct the flow of the portion of the feedstream.

11. The apparatus of claim 10, wherein the respective flow director is U-shaped with a bottom wall and opposed side walls, and wherein the bottom wall is vertical when the respective flow director is in the first position and angled when the respective flow director is in the second position.

12. The apparatus of claim 10, wherein the at least one actuator comprises a first actuator and a second actuator and the at least one flow director comprises a first flow director and a second flow director, and wherein the first flow director is positioned adjacent to a first detection channel of the at least one detection channel and the second flow director is positioned adjacent to a second detection channel of the at least one detection channel; and wherein the first and second actuators independently actuate the first and second flow directors, respectively.

13. A system comprising:

at least one apparatus according to claim 1; and a controller operatively connected to the at least one apparatus, the controller actuating the flow direction mechanism responsive to output from the at least one sensor.

14. The system of claim 13, wherein the at least one apparatus comprises a first apparatus and a second apparatus, and wherein the second apparatus is positioned below the first apparatus such that the second apparatus receives a residual stream of the portion of the feedstream from the first apparatus.

15. The system of claim 14, wherein the first apparatus and the second apparatus are each mounted to a respective mounting plate via at least one respective vibration dampening coupler.

16. A method for making an apparatus, comprising:

providing a detection mechanism;

providing a vibration mechanism for transport of a flowable material through the detection mechanism;

providing a unitary body having homogenous surfaces, wherein providing the unitary body comprises forming the unitary body by three-dimensional printing; and connecting the detection mechanism and the vibration mechanism such that vibrations are homogenously transferred from the vibration mechanism to the detection mechanism; and wherein the detection mechanism and the vibration mechanism are connected via the unitary body.

17. The method of claim 16, further comprising:

providing a flow direction mechanism for directing the flow of the flowable material as the flowable material exits the detection mechanism; and connecting the flow direction mechanism to the unitary body.

* * * * *